US008185576B2

(12) United States Patent
Rose

(10) Patent No.: US 8,185,576 B2
(45) Date of Patent: May 22, 2012

(54) FILTER FOR A DISTRIBUTED NETWORK

(75) Inventor: Anthony Rose, Bellevue Hill (AU)

(73) Assignee: Altnet, Inc., Sherman Oaks, CA (US)

( * ) Notice: Subject to any disclaimer, the term of this patent is extended or adjusted under 35 U.S.C. 154(b) by 1421 days.

(21) Appl. No.: 11/428,321

(22) Filed: Jun. 30, 2006

(65) Prior Publication Data
US 2007/0220116 A1 Sep. 20, 2007

Related U.S. Application Data

(60) Provisional application No. 60/782,545, filed on Mar. 14, 2006.

(51) Int. Cl.
G06F 7/00 (2006.01)
G06F 17/30 (2006.01)
G06F 15/16 (2006.01)
(52) U.S. Cl. ......... 709/203; 709/229; 707/741; 707/830
(58) Field of Classification Search .......... 709/201–203, 709/217–219
See application file for complete search history.

(56) References Cited

U.S. PATENT DOCUMENTS

| | | | |
|---|---|---|---|
| 3,668,647 A | 6/1972 | Evangelisti et al. | |
| 3,835,260 A | 9/1974 | Prescher et al. | |
| 4,096,568 A | 6/1978 | Bennett et al. | |
| 4,215,402 A | 7/1980 | Mitchell et al. | |
| 4,221,003 A | 9/1980 | Chang et al. | |
| 4,290,105 A | 9/1981 | Cichelli et al. | |
| 4,376,299 A | 3/1983 | Rivest | |
| 4,405,829 A | 9/1983 | Rivest et al. | |
| 4,412,285 A | 10/1983 | Neches et al. | |
| 4,414,624 A | 11/1983 | Summer, Jr. et al. | |
| 4,441,155 A | 4/1984 | Fletcher et al. | |
| 4,464,713 A | 8/1984 | Benhase et al. | |
| 4,490,782 A | 12/1984 | Dixon et al. | |
| 4,558,413 A | 12/1985 | Schmidt et al. | |
| 4,571,700 A | 2/1986 | Emry, Jr. et al. | |
| 4,577,293 A | 3/1986 | Matick et al. | |
| 4,642,793 A | 2/1987 | Meaden | |
| 4,658,093 A | 4/1987 | Hellman | |

(Continued)

FOREIGN PATENT DOCUMENTS

EP 0 268 069 A2 5/1988

(Continued)

OTHER PUBLICATIONS

Helm, Burt, A Hard Ride for eDonkey, Oct. 24, 2005, Business Week Online, http://www.businessweek.com/print/magazine/content/05_43/b3956115.htm?chan=gl.

(Continued)

*Primary Examiner* — Ian N Moore
*Assistant Examiner* — Thai Nguyen
(74) *Attorney, Agent, or Firm* — Davidson Berquist Jackson & Gowdey, LLP; Brian Siritzky

(57) ABSTRACT

There is disclosed a filter for a distributed network. A method may include receiving index requests from indexing nodes over a network and providing over the network index responses to the indexing nodes in response to the index requests. The index responses may instruct a receiving indexing node to index a specified file. The method may be implemented in software and on a computer.

40 Claims, 7 Drawing Sheets

U.S. PATENT DOCUMENTS

| | | |
|---|---|---|
| 4,675,810 A | 6/1987 | Gruner et al. |
| 4,691,299 A | 9/1987 | Rivest et al. |
| 4,725,945 A | 2/1988 | Kronstadt et al. |
| 4,773,039 A | 9/1988 | Zamora |
| 4,821,184 A | 4/1989 | Clancy et al. |
| 4,887,235 A | 12/1989 | Holloway et al. |
| 4,888,681 A | 12/1989 | Barnes et al. |
| 4,914,586 A | 4/1990 | Swinehart et al. |
| 4,922,414 A | 5/1990 | Holloway et al. |
| 4,922,417 A | 5/1990 | Churm et al. |
| 4,949,302 A | 8/1990 | Arnold et al. |
| 4,972,367 A | 11/1990 | Burke |
| 5,014,192 A | 5/1991 | Mansfield et al. |
| 5,025,421 A | 6/1991 | Cho |
| 5,047,918 A | 9/1991 | Schwartz et al. |
| 5,050,074 A | 9/1991 | Marca |
| 5,050,212 A | 9/1991 | Dyson |
| 5,057,837 A | 10/1991 | Colwell et al. |
| 5,077,658 A | 12/1991 | Bendert et al. |
| 5,084,815 A | 1/1992 | Mazzario |
| 5,117,351 A | 5/1992 | Miller |
| 5,129,081 A | 7/1992 | Kobayashi et al. |
| 5,129,082 A | 7/1992 | Tirfing et al. |
| 5,144,667 A | 9/1992 | Pogue, Jr. et al. |
| 5,163,147 A | 11/1992 | Orita |
| 5,179,680 A | 1/1993 | Colwell et al. |
| 5,182,799 A | 1/1993 | Tamura et al. |
| 5,199,073 A | 3/1993 | Scott |
| 5,202,982 A | 4/1993 | Gramlich et al. |
| 5,204,897 A | 4/1993 | Wyman |
| 5,204,958 A | 4/1993 | Cheng et al. |
| 5,204,966 A | 4/1993 | Wittenberg et al. |
| 5,208,858 A | 5/1993 | Vollert et al. |
| 5,247,620 A | 9/1993 | Fukuzawa et al. |
| 5,260,999 A | 11/1993 | Wyman |
| 5,276,869 A | 1/1994 | Forrest et al. |
| 5,276,901 A | 1/1994 | Howell et al. |
| 5,287,499 A | 2/1994 | Nemes |
| 5,287,514 A | 2/1994 | Gram |
| 5,297,279 A | 3/1994 | Bannon et al. |
| 5,301,286 A | 4/1994 | Rajani |
| 5,301,316 A | 4/1994 | Hamilton et al. |
| 5,317,693 A | 5/1994 | Cuenod et al. |
| 5,341,477 A | 8/1994 | Pitkin et al. |
| 5,343,527 A | 8/1994 | Moore |
| 5,347,653 A | 9/1994 | Flynn et al. |
| 5,351,302 A | 9/1994 | Leighton et al. |
| 5,357,440 A | 10/1994 | Talbott et al. |
| 5,357,623 A | 10/1994 | Megory-Cohen |
| 5,359,523 A | 10/1994 | Talbott et al. |
| 5,361,356 A | 11/1994 | Clark et al. |
| 5,371,897 A | 12/1994 | Brown et al. |
| 5,384,565 A | 1/1995 | Cannon |
| 5,394,555 A | 2/1995 | Hunter et al. |
| 5,403,639 A | 4/1995 | Belsan et al. |
| 5,404,508 A | 4/1995 | Konrad et al. |
| 5,438,508 A | 8/1995 | Wyman |
| 5,442,343 A | 8/1995 | Cato et al. |
| 5,448,668 A | 9/1995 | Perelson et al. |
| 5,448,718 A | 9/1995 | Cohn et al. |
| 5,452,447 A | 9/1995 | Nelson et al. |
| 5,454,000 A | 9/1995 | Dorfman |
| 5,454,039 A | 9/1995 | Coppersmith et al. |
| 5,459,860 A | 10/1995 | Burnett et al. |
| 5,465,365 A | 11/1995 | Winterbottom |
| 5,467,471 A | 11/1995 | Bader |
| 5,475,826 A | 12/1995 | Fischer |
| 5,479,654 A | 12/1995 | Squibb |
| 5,491,817 A | 2/1996 | Gopal et al. |
| 5,499,294 A | 3/1996 | Friedman |
| 5,504,879 A | 4/1996 | Eisenberg et al. |
| 5,530,757 A | 6/1996 | Krawczyk |
| 5,537,585 A | 7/1996 | Blickenstaff et al. |
| 5,542,087 A | 7/1996 | Neimat et al. |
| 5,553,143 A | 9/1996 | Ross et al. |
| 5,568,181 A | 10/1996 | Greenwood et al. |
| 5,581,615 A | 12/1996 | Stern |
| 5,581,758 A | 12/1996 | Burnett |
| 5,581,764 A | 12/1996 | Fitzgerald et al. |
| 5,583,995 A | 12/1996 | Gardner et al. |
| 5,588,147 A | 12/1996 | Neeman et al. |
| 5,600,834 A | 2/1997 | Howard |
| 5,604,803 A | 2/1997 | Aziz |
| 5,604,892 A | 2/1997 | Nuttall et al. |
| 5,630,067 A | 5/1997 | Kindell et al. |
| 5,632,031 A | 5/1997 | Velissaropoulos et al. |
| 5,638,443 A | 6/1997 | Stefik et al. |
| 5,640,564 A | 6/1997 | Hamilton et al. |
| 5,649,196 A | 7/1997 | Woodhill et al. |
| 5,677,952 A | 10/1997 | Blakley, III et al. |
| 5,678,038 A | 10/1997 | Dockter et al. |
| 5,678,046 A | 10/1997 | Cahill et al. |
| 5,694,472 A | 12/1997 | Johnson et al. |
| 5,694,596 A | 12/1997 | Campbell |
| 5,701,316 A | 12/1997 | Alferness et al. |
| 5,710,922 A | 1/1998 | Alley et al. |
| 5,724,425 A | 3/1998 | Chang et al. |
| 5,724,552 A | 3/1998 | Taoda |
| 5,742,807 A | 4/1998 | Masinter |
| 5,745,879 A | 4/1998 | Wyman |
| 5,757,913 A | 5/1998 | Bellare et al. |
| 5,757,915 A | 5/1998 | Aucsmith et al. |
| 5,781,629 A | 7/1998 | Haber et al. |
| 5,802,291 A | 9/1998 | Balick et al. |
| 5,809,494 A | 9/1998 | Nguyen |
| 5,826,049 A | 10/1998 | Ogata et al. |
| 5,835,087 A | 11/1998 | Herz et al. |
| 5,864,683 A | 1/1999 | Boebert et al. |
| 5,907,619 A | 5/1999 | Davis |
| 5,907,704 A | 5/1999 | Gudmundson et al. |
| 5,940,504 A | 8/1999 | Griswold |
| 5,978,791 A | 11/1999 | Farber et al. |
| 5,991,414 A | 11/1999 | Garay et al. |
| 6,006,018 A | 12/1999 | Burnett et al. |
| 6,134,603 A | 10/2000 | Jones et al. |
| 6,135,646 A | 10/2000 | Kahn et al. |
| 6,167,438 A * | 12/2000 | Yates et al. ............ 709/216 |
| 6,415,280 B1 | 7/2002 | Farber et al. |
| 6,487,643 B1 * | 11/2002 | Khare et al. ............ 711/150 |
| 6,675,205 B2 | 1/2004 | Meadway |
| 6,732,180 B1 | 5/2004 | Hale et al. |
| 6,816,872 B1 | 11/2004 | Squibb |
| 6,928,442 B2 | 8/2005 | Farber et al. |
| 6,950,821 B2 | 9/2005 | Faybishenko |
| 6,963,975 B1 | 11/2005 | Weare |
| 7,802,310 B2 | 9/2010 | Farber et al. |
| 2002/0052884 A1 | 5/2002 | Farber et al. |
| 2002/0052885 A1* | 5/2002 | Levy .................... 707/200 |
| 2002/0082999 A1 | 6/2002 | Lee et al. |
| 2002/0184224 A1* | 12/2002 | Haff et al. .............. 707/10 |
| 2002/0188735 A1* | 12/2002 | Needham et al. ........ 709/229 |
| 2003/0078888 A1 | 4/2003 | Lee et al. |
| 2003/0078889 A1 | 4/2003 | Lee et al. |
| 2003/0095660 A1 | 5/2003 | Lee et al. |
| 2003/0149871 A1* | 8/2003 | Medvinsky ............. 713/155 |
| 2004/0098370 A1 | 5/2004 | Garland |
| 2004/0139097 A1 | 7/2004 | Farber et al. |
| 2004/0193900 A1* | 9/2004 | Nair ..................... 713/193 |
| 2005/0010792 A1 | 1/2005 | Carpentier et al. |
| 2005/0076082 A1* | 4/2005 | Le Pennec et al. ....... 709/206 |
| 2005/0091167 A1 | 4/2005 | Moore |
| 2005/0108368 A1 | 5/2005 | Mohan |
| 2005/0114296 A1 | 5/2005 | Farber et al. |
| 2005/0114709 A1* | 5/2005 | Moore .................. 713/201 |
| 2005/0169467 A1 | 8/2005 | Risan |
| 2005/0198020 A1 | 9/2005 | Garland |
| 2006/0031381 A1 | 2/2006 | Van Luijt |
| 2006/0101408 A1* | 5/2006 | Kotamarthi et al. ...... 717/126 |
| 2007/0061269 A1* | 3/2007 | Dimkovic ............... 705/59 |
| 2007/0185848 A1 | 8/2007 | Farber et al. |
| 2008/0059419 A1* | 3/2008 | Auerbach et al. ........ 707/3 |
| 2008/0065635 A1 | 3/2008 | Farber et al. |
| 2008/0066191 A1 | 3/2008 | Farber et al. |
| 2008/0071855 A1 | 3/2008 | Farber et al. |
| 2008/0082551 A1 | 4/2008 | Farber et al. |

FOREIGN PATENT DOCUMENTS

| | | |
|---|---|---|
| EP | 0 315 425 | 5/1989 |
| EP | 0 558 945 A2 | 9/1993 |
| EP | 0 566 967 A2 | 10/1993 |
| EP | 0592045 | 4/1994 |
| EP | 0631 226 A1 | 12/1994 |
| EP | 0 654 920 A2 | 5/1995 |
| EP | 0 658 022 A2 | 6/1995 |
| GB | 2294132 A | 4/1996 |
| JP | 59058564 | 4/1984 |
| JP | 63-106048 | 5/1988 |
| JP | 63-273961 | 11/1988 |
| JP | 2-127755 | 5/1990 |
| JP | 05162529 | 6/1993 |
| JP | 06187384 A2 | 7/1994 |
| JP | 06348558 A | 12/1994 |
| WO | WO 92/20021 | 11/1992 |
| WO | WO 94/06087 | 3/1994 |
| WO | WO 94/20913 | 9/1994 |
| WO | WO 95/01599 | 1/1995 |
| WO | WO 97/43717 | 11/1997 |

OTHER PUBLICATIONS

Cohen, Bram, Incentives Build Robustness in BitTorrent, May 22, 2003. www.bittorrent.org/bittorrentecon.pdf.

Truelove, Kelly, Gnutella and the Transient Web, Mar. 22, 2001, http://www.openp2p.com/lpt/a/705.

Thompson, Clive, The BitTorrent Effect, Wired Magazine, Jan. 2005, http://www.wired.com/wired/archive/13.01/bittorrent_pr.html.

Baquero, Carlos and Nuno Lopes, Towards Peer-to-Peer Content Indexing, ACM SIGOPS Operating Systems Review, vol. 37, Issue 4 (Oct. 2003). pp. 90-96.

Stoica, Ion et al., Chord: A Scalable Peer-to-peer Lookup Service for Internet Applications, SIGCOMM'01. Aug. 27-31, 2001, San Diego, California, USA, pp. 149-160.

Winslett, Marianne et al., PeerAccess: A Logic for Distributed Authorization, CCS'05, Nov. 7-11, 2005, Alexandria, Virginia, pp. 168-179.

Damiani, Ernesto, et al., A Reputation-Based Approach for Choosing Reliable Resources in Peer-to-Peer Networks, CCS '02, Nov. 18-22, 2002, Washington, DC, pp. 207-216.

Androutsellis-Theotokis, Stephanos and Diomidis Spinellis, A Survey of Peer-to-Peer Content Distribution Technologies, ACM Computing Surveys, vol. 36, No. 4, Dec. 2004, pp. 335-371.

Nejdl, Wolfgang, et al., Super-Peer-Based Routing and Clustering Strategies for RDF-Based Peer-To-Peer Networks, WWW2003, May 20-24, 2003, Budapest, Hungary, pp. 536-543.

Advances in Cryptology-AUSCRYPT '92—Workshop on the Theory and Application of Cryptographic Techniques Gold Coast, Queensland, Australia Dec. 13-16, 1992 Proceedings.

Advances in Cryptology-EUROCRYPT '93, Workshop on the Theory and Application of Cryptographic Techniques Lofthus, Norway, May 23-27, 1993 Proceedings.

Alexander Dupuy (dupuy@smarts.com), "MD5 and LIFNs (was: Misc Comments)", www.acl.lanl.gov/URI/archive/uri-94q2.messages/0081.html, Apr. 17, 1994.

Alexander Dupuy (dupuy@smarts.com), "RE: MD5 and LIFNs (was: Misc Comments)", www.acl.lanl.gov/URI/archive/uri-94q2.messages/0113.html, Apr. 26, 1994.

Barbara, D., et al., "Exploiting symmetries for low-cost comparison of file copies," 8th Int'l Conf. on Distributed Computing Systems, Jun. 1988, pp. 471-479, San Jose, CA.

Berners-Lee, T. et al., RFC 1738, "Uniform Resource Locators (URL)," pp. 1-25, The Internet Engineering Task Force (IETF), Network Working Group, Dec. 1994.

Berners-Lee, T. et al., RFC 1945, "Hypertext Transfer Protocol—HTTP/1.0," The Internet Engineering Task Force (IETF), Network Working Group, May 1996, pp. 1-60.

Berners-Lee, T., RFC 1630 "Universal Resource Identifiers in WWW," The Internet Engineering Task Force (IETF), Network Working Group, Jun. 1994, pp. 1-28.

Berson, Thomas A., Differential Cryptanalysis Mod $2^{32}$ with Applications to MD5, in Proc. Advances in Cryptology—EUROCRYPT '92, Hungary, May 24-28, 1992, pp. 69-81.

Bowman, C. Mic, et al., "Harvest: A Scalable, Customizable Discovery and Access System," Aug. 4, 1994, pp. 1-27.

Bowman, C. Mic, et al., "Harvest: A Scalable, Customizable Discovery and Access System," Tech. Report CU-CS-732-94, Dept. Comp. Sci., U. of. Colorado—Boulder, original date Aug. 1994, revised Mar. 1995, pp. 1-29.

Brisco, T., "DNS Support for Load Balancing," The Internet Engineering Task Force (IETF), RFC 1794, Apr. 1995, pp. 1-7.

Browne, Shirley et al., "Location-Independent Naming for Virtual Distributed Software Repositories," Nov. 11, 1994, printed from http:/www.netlib.org/utk/papers/lifn/main.html on Mar. 22, 2006, 18 pages.

Browne, Shirley et al., "Location-Independent Naming for Virtual Distributed Software Repositories," Univ. of Tennessee, Dept. Comp. Sci., Feb. 1995, also in ACM-SIGSOFT 1995 Symp. on Software Reusability, Seattle, Wash. Apr. 1995, 7 pages.

Campbell, M., "The Design of Text Signatures for Text Retrieval Systems," Tech. Report, Sep. 5, 1994, Deakin University, School of Computing & Math., Geelong, Australia.

Carter, J. Lawrence, et al. "Universal Classes of Hash Functions." Journal of Computer and System Sciences, vol. 18, No. 2, Apr. 1979, pp. 143-154.

Chang, W. W. et al., "A signature access method for the Starburst database system," in Proc. 15th Int'l Conf. on Very Large Data Bases (Amsterdam, The Netherlands), pp. 145-153.

Cheriton, David R. and Mann, Timothy P., "Decentralizing a global naming service for improved performance and fault tolerance", ACM Transactions on Computer Systems, vol. 7, No. 2, May 1989, pp. 147-183.

Clifford Lynch (Calur@uccmvsa.bitnet), "ietf url/uri overview draft paper (long)", www.acl.lanl.gov/URI/archive/uri-93q1.messages/0015.html, Mar. 25, 1993.

Cormen, Thomas H., et al. Introduction to Algorithms, The MIT Press, Cambridge, Massachusetts, 1994, pp. 219-243, 991-993.

Danzig, P.B., et al., "Distributed Indexing: A Scalable Mechanism for Distributed Information Retrieval," Proc. 14th Annual Int'l ACM SIGIR Conf. on Research and Development in Information Retrieval, pp. 220-229, Oct. 13-16, 1991.

Davis, James R., "A Server for a Distributed Digital Technical Report Library," Jan. 15, 1994, pp. 1-8.

Deering, Stephen, et al. "Multicast Routing in Datagram Internetworks and Extended LANs." ACM Transactions on Computer Systems, vol. 8, No. 2, May 1990, pp. 85-110.

den Boer, B., et al., Collisions for the compression function of MD5, in Advances in Cryptology, Proc. EUROCRYPT '93, pp. 292-304, 1994.

Deutsch, Peter (peterd@bunyip.com), "Re: MD5 and LiFNs (was: Misc Comments)", www.aclianl.gov/URI/archive/uri-94q2.messages/0106.html, Apr. 26, 1994.

Devine, Robert. "Design and Implementation of DDH: A Distributed Dynamic Hashing Algorithm." In Proc. of 4th International Conference on Foundations of Data Organizations and Algorithms, 1993, pp. 101-114.

Faloutsos, C. "Access methods for text," ACM Comput. Surv. 17, 1 (Mar. 1985), 49-74.

Faloutsos, C. et al., "Description and performance analysis of signature file methods for office filing," ACM Trans. Inf. Syst. 5, 3 (Jul. 1987), 237-257.

Faloutsos, C. et al., "Signature files: an access method for documents and its analytical performance evaluation," ACM Trans. Inf. Syst. 2, 4 (Oct. 1984), 267-288.

Falstrom, P. et al., RFC 1914, "How to Interact with a Whois++ Mesh," The Internet Engineering Task Force (IETF), Network Working Group, Feb. 1996, pp. 1-10.

Federal Information Processing Standards (FIPS) Publication 180-1; Secure Hash Standard, Apr. 17, 1995 [17 pgs.].

Feeley, Michael, et al. "Implementing Global Memory Management in a Workstation Cluster." In Proc. of the 15th ACM Symp. on Operating Systems Principles, 1995, pp. 201-212.

Feigenbaum, J. et al., "Cryptographic protection of databases and software," in Distributed Computing and Cryptography: Proc. DIMACS Workshop, Apr. 1991, pp. 161-172, American Mathematical Society, Boston, Mass.

Fielding, R. et al., RFC 2068, "Hypertext Transfer Protocol—HTTP/1.1," The Internet Engineering Task Force (IETF), Network Working Group, Jan. 1997, pp. 1-163.

Fielding, R. et al., RFC 2616, "Hypertext Transfer Protocol—HTTP/1.1," The Internet Engineering Task Force (IETF), Network Working Group, Jun. 1999, pp. 1-176.

Floyd, Sally, et al. "A reliable Multicast Framework for Light-Weight Sessions and Application Level Framing." in Proceeding of ACM SIGCOMM '95, pp. 342-356.

Fowler, et al. "A User-Level Replicated File System," AT&T Bell Laboratories Technical Memorandum 0112670-930414-05, Apr. 1993, and Usenix 1993 Summer Conference Proceedings, Cincinnati, OH, Jun. 1993.

Fredman, Michael, et al. "Storing a Sparse Table with 0(1) Worst Case Access Time." Journal of the Association for Computing Machinery, vol. 31, No. 3, Jul. 1984, pp. 538-544.

Friedman, G.L., Digital Camera With Apparatus for Authentication of Images Produced From an Image File, NASA Case No. NPO-19108-1-CU, U.S. Appl. No. 08/159,980, Nov. 24, 1993.

Greene, D., et al., "Multi-Index Hashing for Information Retrieval", Nov. 20-22, 1994, Proceedings, 35th Annual Symp on Foundations of Computer Science, IEEE, pp. 722-731.

Grigni, Michelangelo, et al. "Tight Bounds on Minimum Broadcasts Networks." SIAM Journal of Discrete Mathematics, vol. 4, No. 2, May 1991, pp. 207-222.

Gwertzman, James, et al. "The Case for Geographical Push-Caching." Technical Report HU TR 34-94 (excerpt), Harvard University, DAS, Cambridge, MA 02138, 1994, 2 pgs.

Harrison, M. C., "Implementation of the substring test by hashing," Commun. ACM 14, 12 (Dec. 1971), 777-779.

Hauzeur, B. M., "A Model for Naming, Addressing, and Routing," ACM Trans. Inf. Syst. 4, Oct. 4, 1986), 293-311.

Hirano, et al, "Extendible hashing for concurrent insertions and retrievals," in Proc 4th Euromicro Workshop on Parallel and Distributed Processing, 1996 (PDP '96), Jan. 24, 1996 to Jan. 26, 1996, pp. 235-242, Braga , Portugal.

Horowitz, Expert Report of Professor Ellis Horowitz, Mar. 13, 2006, in C.D. Cal. case No. CV 04-7456 JFW (CTx) [185 pgs.].

IEEE, The Authoritative Dictionary of IEEE Standards Terms, 7th ed., Copyright 2000, pp. 107, 176, 209, 240, 241, 432, 468, 505, 506, 682, 1016, 1113, 1266, and 1267.

Ishikawa, Y., et al., "Evaluation of signature files as set access facilities in OODBs," In Proc. of the 1993 ACM SIGMOD Inter. Conf. on Management of Data (Washington, D.C., U.S., May 1993). P. Buneman & S. Jajodia, Eds. SIGMOD '93. ACM, NY, NY, 247-256.

Karp, R. M. and Rabin, M. O., "Efficient randomized pattern-matching algorithms," IBM J. Res. Dev. 31, 2 (Mar. 1987), 249-260.

Khare, R. and Lawrence, S., RFC 2817, "Upgrading to TLS Within HTTP/1.1," The Internet Engineering Task Force (IETF), May 2000, pp. 1-12.

Khoshafian, S. N. et al. 1986. Object identity. In Conf. Proc. on Object-Oriented Programming Systems, Languages and Applications (Portland, Oregon, United States, Sep. 29-Oct. 2, 1986). N. Meyrowitz, Ed. OOPLSA '86. ACM Press, New York, NY, 406-416.

Kim et al., "Experiences with Tripwire: Using Integrity Checkers for Intrusion Detection", COAST Labs. Dept. of Computer Sciences Purdue University, Feb. 22, 1995, pp. 1-12.

Kim et al., "The Design and Implementation of Tripwire: A file System Integrity Checker", COAST Labs. Dept. of Computer Sciences Purdue University, Feb. 23, 1995, pp. 1-18.

Kim et al., "The Design and Implementation of Tripwire: A file System Integrity Checker", COAST Labs. Dept. of Computer Sciences Purdue University, Nov. 19, 1993, pp. 1-21.

Kim, Gene H., and Spafford, Eugene H., "Writing, Supporting, and Evaluating Tripwire: A Publicly Available Security Tool." COAST Labs. Dept. of Computer Sciences Purdue University, Mar. 12, 1994, pp. 1-23.

Kitsuregawa, M.; Tanaka, H.; Moto-Oka, T. (Mar. 1983). "Application of Hash to Data Base Machine and Its Architecture". New Generation Computing 1 (1): 63-74, Ohmsha, Ltd. and Springer-Verlag.

Knuth, D. E., "The Art of Computer Programming," 1973, vol. 3 "Sorting and Searching," Ch. 6.4 "Hashing," pp. 506-549.

Kumar, Vijay, A Concurrency Control Mechanism Based on Extendible Hashing for Main Memory Database Systems, ACM, vol. 3, 1989, pp. 109-113.

Langer, A. (cmf851@anu.oz.au), http://groups.google.com/groups?selm=1991Aug7.225159.786%40newshostanu. edu.au&oe=UTF-8 &output=gplain, Aug. 7, 1991.

Lantz, K. A., et al., "Towards a universal directory service." In Proc. 4th Annual ACM Symp. on Principles of Distributed Computing (Minaki, Ontario, Canada). PODC '85. ACM Press, New York, NY, 250-260.

Leach, P. J., et al.. The file system of an integrated local network. In Proc. 1985 ACM 13th Annual Conf. on Comp. Sci. CSC '85. ACM Press, NY, NY, 309-324.

Leach, P.J., et al., "UIDs as Internal Names in a Distributed File System," In Proc. 1st ACM SIGACT-SIGOPS Symp. on Principles of Distributed Computing (Ottawa, Canada, Aug. 18-20, 1982). PODC '82. ACM Press, New York, NY, 34-41.

Ma, C. 1992. On building very large naming systems. In Proc. 5th Workshop on ACM SIGOPS European Workshop: Models and Paradigms for Distributed Systems Structuring (France, Sep. 21-23, 1992). EW 5. ACM Press, New York, NY, 1-5.

McGregor D. R. and Mariani, J. A. "Fingerprinting—A technique for file identification and maintenance," Software: Practice and Experience, vol. 12, No. 12, Dec. 1982, pp. 1165-1166.

Ming-Ling Lo et al., On Optimal Processor Allocation to Support Pipelined Hash Joins, ACM SIGMOD, pp. 69-78, May 1993.

Moats, R., RFC 2141, "URN Syntax," The Internet Engineering Task Force (IETF), Network Working Group, May 1997, pp. 1-8.

Murlidhar Koushik, Dynamic Hashing With Distributed Overflow Space: A File Organization With Good Insertion Performance, 1993, Info. Sys., vol. 18, No. 5, pp. 299-317.

Myers, J. and Rose, M., RFC 1864, "The Content-MD5 Header Field," The Internet Engineering Task Force (IETF), Oct. 1995, pp. 1-4.

Naor, Moni, et al. "The Load, Capacity and Availability of Quorum Systems." In Proceedings of the 35th IEEE Symposium on Foundations of Computer Science, Nov. 1994, pp. 214-225.

Nisan, Noam. "Psuedorandom Generators for Space-Bounded Computation." In Proceedings of the Twenty-Second Annual ACM Symposium on Theory of Computing, May 1990, pp. 204-212.

Palmer, Mark, et al. "Fido: A Cache that Learns to Fetch." In Proceedings of the 17th International Conference on Very Large Data Bases, Sep. 1991, pp. 255-264.

Panagopoulos, G., et al., "Bit-sliced signature files for very large text databases on a parallel machine architecture," in Proc. of the 4th Inter. Conf. on Extending Database Technology (EDBT), Cambridge, U.K., Mar. 1994, pp. 379-392 (Proc. LNCS 779 Springer 1994, ISBN 3-540-57818-8) [14 pgs.].

Patent Abstract, "Management System for Plural Versions," Pub. No. 63273961 A, published Nov. 11, 1988, NEC Corp.

Patent Abstracts of Japan, "Data Processor," Appln. No. 05135620, filed Jun. 7, 1993, Toshiba Corp.

Patent Abstracts of Japan, "Device for Generating Database and Method for the Same," Application No. 03-080504, Sun Microsyst. Inc., published Jun. 1993, 38 pages.

Patent Abstracts of Japan, "Electronic Mail Multiplexing System and Communication Control Method in the System." Jun. 30, 1993, JP 05162529.

Patent Abstracts of Japan, "Method for Registering and Retrieving Data Base," Application No. 03-187303, Nippon Telegr. & Teleph. Corp., published Feb. 1993, 11 pages.

Peleg, David, et al. "The Availability of Quorum Systems." Information and Computation 123, 1995, 210-223.

Peterson, L. L. 1988. A yellow-pages service for a local-area network. In Proc. ACM Workshop on Frontiers in Computer Communications Technology (Vermont, 1987). J. J. Garcia-Luna-Aceves, Ed. SIGCOMM '87. ACM Press, New York, NY, 235-242.

Pfitzman, Birgit, Sorting Out Signature Schemes, Nov. 1993, 1st Conf. Computer & Comm. Security '93 pp. 74-85.

Preneel et al., "The Cryptographic Hash Function RIPEMD-160", appeared in CryptoBytes RSA Laboratories, vol. 3, No. 2, pp. 9-14, Fall, 1997 (also Bosselaers et al., "The Ripemd-160 Cryptographic Hash Function", Jan. 1997, Dr. Dobb's Journal, pp. 24-28).

Proceedings of the 1993 ACM SIGMOD International Conference on Management of Data, vol. 22, Issue 2, Jun. 1993.

Prusker et al., "The Siphon: Managing Distant Replicated Repositories" Nov. 8-9, 1990, Proc. Management of Replicated Data IEEE.

Rabin, Michael. "Efficient Dispersal of Information for Security, Load Balancing, and Fault Tolerance." Journal of the ACM, vol. 36, No. 2, Apr. 1989, pp. 335-348.

Ravi, R., "Rapid Rumor Ramification: Approximating the Minimum Broadcast Time." in Proc. of the 35th IEEE Symp. on Foundation of Computer Science, Nov. 1994, pp. 202-213.

Ravindran, K. and Ramakrishnan, K. K. 1991. A naming system for feature-based service specification in distributed operating systems. SIGSMALL/PC Notes 17, 3-4 (Sep. 1991), 12-21.

Reed Wade (wade@cs.utk.edu), "re: Dienst and BFD/LIFN emails," Aug. 8, 1994, printed from http://www.webhistory.org/www.lists/www-talk1994q3/0416.html on Mar. 22, 2006, (7 pages).

Rich, K. et al, "Hobgoblin: A File and Directory Auditor", Sep. 30-Oct. 3, 1991, Lisa V., San Diego, CA.

Rivest, R., RFC 1320, "The MD4 Message-Digest Algorithm," The Internet Engineering Task Force (IETF), Apr. 1992.

Rivest, R., RFC 1321, "The MD5 Message-Digest Algorithm," The Internet Engineering Task Force (IETF), Apr. 1992, pp. 1-19 and errata sheet (1 page).

Rose, M., RFC 1544, "The Content-MD5 Header Field," The Internet Engineering Task Force (IETF), Nov. 1993, pp. 1-3.

Ross, K., "Hash-Routing for Collections of Shared Web Caches," IEEE Network Magazine, pp. 37-44, Nov.-Dec. 1997.

Sacks-Davis, R., et al., "Multikey access methods based on superimposed coding techniques," ACM Trans. Database Syst. 12, 4 (Nov. 1987), 655-696.

Sakti Pramanik et al., Multi-Directory Hasing, 1993, Info. Sys., vol. 18, No. 1, pp. 63-74.

Schmidt, Jeanette, et al. "Chernoff-Hoeffding Bounds for Applications with Limited Independence." In Proceedings of the 4th ACS-SIAM Symposium on Discrete Algorithms, 1993, pp. 331-340.

Schneier, B., "One-Way Hash Functions, Using Crypographic Algorithms for Hashing," 1991, printed from http://202.179135.4/data/DDJ/articles/1991/9109/91909g/9109g.htm on Mar. 22, 2006 [9 pgs.].

Schwartz, M., et al. 1987. A name service for evolving heterogeneous systems. In Proc. 11th ACM Symp. on OS Principles (Texas, Nov. 8-11, 1987). SOSP '87. ACM Press, NY, NY, 52-62.

Shaheen-Gouda, A. and Loucks, L. 1992. Name borders. In Proc. 5th Workshop on ACM Sigops European Workshop: Models and Paradigms for Distributed Systems Structuring (Mont Saint-Michel, France, Sep. 21-23, 1992). EW 5. ACM Press, NY, NY, 1-6.

Siegel, A., et al., "Deceit: a Flexible Distributed File System," Proc. Workshop on the Management of Replicated Data, Houston, TX, pp. 15-17, Nov. 8-9, 1990.

Siegel, A., et al., "Deceit: a Flexible Distributed File System," Technical Report, TR89-1042, Cornell University, Nov. 1989.

Sollins, K. et al., RFC 1737, "Functional Requirements for Uniform Resource Names", www.w3.org/Addressing/rfc1737.txt, The Internet Engineering Task Force (IETF), Dec. 1994, pp. 1-7.

Sun Microsystems, Inc., RFC 1094, "NFS: Network File System Protocol Specification," The Internet Engineering Task Force (IETF), Mar. 1989, pp. 1-27.

Tarjan, Robert Endre, et al. "Storing a Sparse Table." Communications of the ACM, vol. 22, No. 11, Nov. 1979, pp. 606-611.

Terry, D. B. 1984. An analysis of naming conventions for distributed computer systems. In Proc. ACM SIGCOMM Symp. on Communications Architectures and Protocols: Tutorials & Symp. SIGCOMM '84. ACM Press, NY, NY, 218-224.

Vincenzetti, D. et al., "Anti Tampering Program," Proc. Fourth {USENIX} Security Symp. , Santa Clara, (USENIX Association) CA, Oct. 1993, 11 pages.

Vincenzetti, D. et al., "Anti Tampering Program," Proc. Fourth {USENIX} Security Symp., Santa Clara, CA, Oct. 1993, printed from http://www.ja.net/CERI/Vincenzetti_and_Cotrozzi/ATP_Anti_Tamp on Mar. 22, 2006, (USENIX Association) 8 pgs.

Vitter, Jeffrey Scott, et al. "Optimal Prefetching via Data Compression." In Proceedings of 32nd IEEE Symposium on Foundations of Computer Science, Nov. 1991, pp. 121-130.

W3C:ID, HTTP: A protocol for networked information, "Basic HTTP as defined in 1992", www.w3.org/Protocols/HTTP2.html, 1992.

Wegman, Mark, et al. "New Hash Functions and Their Use in Authentication and Set Equality." Journal of Computer and System Sciences vol. 22, Jun. 1981, pp. 265-279.

William Perrizo, et al., Distributed Join Processing Performance Evaluation, 1994. Twenty-Seventh Hawaii International Conference on System Sciences, vol. II, pp. 236-244.

Witold Litwin et al., Linear Hashing for Distributed Files, ACM SIGMOD, May 1993, pp. 327-336.

Witold Litwin, et al., LH-Linear Hashing for Distributed Files, HP Labs Tech. Report No. HPL-93-21 Jun. 1993 pp. 1-22.

Yao, Andrew Chi-Chih. "Should Tables be Sorted?" Journal of the Association for Computing Machinery, vol. 28, No. 3, Jul. 1981, pp. 615-628.

Zheng, Y., et al., HAVAL—A One-Way Hashing Algorithm with Variable Length of Output (Extended Abstract), pp. 83-105, Advances in Cryptology, Auscript '92, 1992.

Zhiyu Tian, et al., A New Hashing Function: Statistical Behaviour and Algorithm, pp. 3-13, SIGIR Forum, Spring 1993.

The Gnutella Protocol Specification v0.4, Document revision 1.2, (est. Jun. 2001) [10 pgs.].

* cited by examiner

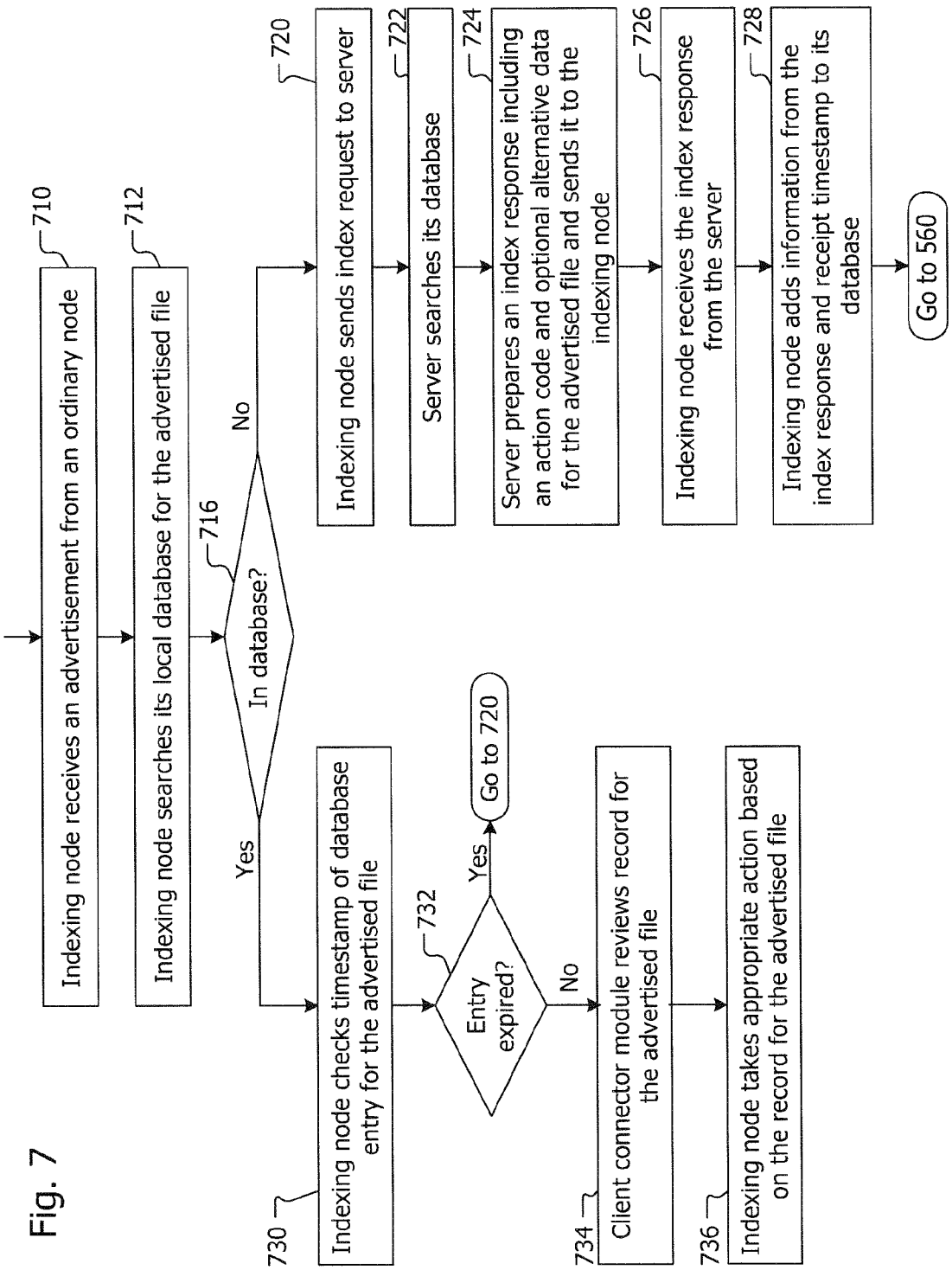

FILTER FOR A DISTRIBUTED NETWORK

RELATED APPLICATION INFORMATION

This patent claims the benefit of provisional application No. 60/782,545 filed Mar. 14, 2006 which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to peer-to-peer networks and the filtering of information available for storage on peer-to-peer networks.

2. Related Art

Peer-to-peer networks are an autonomous network of computers that communicate with one another. Users of peer-to-peer networks make their files available for sharing by advertising available files, that is, broadcasting the availability of the files to peers and by allowing downloads of available files by peers on the network. Peer-to-peer networks may contain a broad variety of content, the distribution of which may infringe the copyright of the owner of the content. Content may include music, photographs, books, magazines, movies, televisions shows, and other works which may be protected by copyright laws. Example peer-to-peer networks include FastTrack, eDonkey, Gnutella and BitTorrent. As peer-to-peer networks proliferate, copyright holders seek the means to remove infringing material availability on peer-to-peer networks.

For centralized networks an index of available content is held in a central database, and all searches for available content on the network are conducted through the central database. As such, the central database may identify and remove infringing content. However, for decentralized peer-to-peer networks, there is no central database of available content. Peer-to-peer networks provide a distributed, ad hoc indexing function. The indexing function is distributed in that typically no one node on the network contains a copy of the entire list of content that is available on the network. Instead, hundreds, thousands or even millions of nodes contain small indexes, each containing a subset of the total available content. The index functionality is ad hoc in the sense that indexing nodes may go offline or come online at any time, and that any particular node may or may not be capable of providing indexing functionality.

The unruly group of distributed ad hoc indexing nodes that provide the content on peer-to-peer networks has been viewed by some as uncontrollable, in that there has been no successfully widely deployed technique to prevent the distribution of copyright infringing content. Content owners and technology companies have focused their efforts on filtering content from peer-to-peer networks using two techniques. These two techniques are referred to herein as "point of search/download solutions" and "point of sharing solutions."

A. Point of Search/Download Solutions

Point of search/download solutions attempt to filter out infringing content from being displayed in search results at the peer-to-peer network user's computer. An example point of search/download solution may perform the following actions:

1. User A initiates a peer-to-peer search for a file having a specified keyword by using a peer-to-peer application on user A's computer to contact other nodes on the peer-to-peer network requesting search a list of available files which match the keyword.
2. If any matching files are found, search results containing information about those files (which may be or include "metadata") is returned to User A's peer-to-peer application.
3. Before displaying the search results, User A's peer-to-peer application may evaluate whether the search results include links to infringing content. For example, User A's peer-to-peer application may contain a filter list of keywords representing infringing content, such as names of artists whose works are owned by a particular copyright holder. When the search results contain one or more keywords included in a filter list, the peer-to-peer application may block the matching search result from being displayed. Or, for example, User A's peer-to-peer application may contact a server to learn whether the search results contain any infringing content.

A point of search/download solution removes search results and/or the ability to download infringing content by filtering out (that is, removing) from those results infringing entries so that infringing content is not displayed to the user in response to a search by that user.

Point of search/download solutions have numerous and obvious problems, including the following: a) A filter list of all infringing content must be distributed to the computer of every user on the network. b) Every node on the network may be required to check with a filter server to evaluate the search results before displaying the search results to the user. c) To achieve a) and b) requires that the filter server have enormous bandwidth and processing capacities which causes the point of search/download solution to be very expensive to run. d) There are privacy issues that may arise if users' search queries and/or search results are passed to a filter server. The owners of the filter server and/or the government authorities may inspect the search results and, by correlating those search requests and/or results with users' IP addresses, may monitor the behavior of users in a way that falls outside of their mandate of preventing the distribution of selected copyright infringing works. For example, a government authority in a repressive country may use such means to charge a particular user on the network with searching for homosexual content, or for searching for information on freedom charters, etc. e) Finally, any user who obtains a hacked version of the peer-to-peer application—i. e. a version of the peer-to-peer application where the filtering function has been removed or circumvented—may be able to obtain unfiltered search results. There is therefore a direct and obvious motive for hackers to attempt to create such a derivative unfiltered product and for users to download such a product en masse. In other words, shortly after the product has been hacked, as it inevitably would be, any user who wishes to obtain access to infringing content, or who wishes to avoid the privacy concerns outlined above, will replace their existing filtered version of the peer-to-peer application software with the hacked version. As a result of these problems, a point of search/download solution has no or limited success as a tool for preventing distribution of infringing content on peer-to-peer networks.

B. Point of Sharing Solutions

Point of sharing solutions provide another approach. Instead of trying to filter incoming search results on a user's personal computer, a point of sharing solution tries to prevent a user from sharing infringing files. That is, the point of sharing solutions block infringing files from being made available on the network by a given user, so that infringing files will not appear as a search result to users. Stated another way, point of sharing solutions prohibit peer-to-peer applications from advertising infringing content. However, to achieve this, as with point of search/download solutions, each computer must keep a large filter list or check with a server before advertising a particular file.

Point of sharing solutions suffer similar problems as point of search/download solutions, including: a) Requiring a filter server to handle a large amount of network traffic to evaluate advertised files before they are shared. b) High operating costs caused by the network traffic of a). b). Privacy issues like those described above, at least as great as those outlined above, and possibly greater, because the central authority now potentially has knowledge of each file shared by every user on the network. c) The incentive to create a hacked version of the peer-to-peer application is a little less than for the point of search/download solution, because there is little to be gained by using a hacked version. d) However, if even, say, 10% of users make use of a hacked version of the client peer-to-peer application and are able to share infringing content, then the content may become readily available on the network. As such, point of sharing solutions have no or limited success as a tool for preventing distribution of infringing content on a peer-to-peer network.

DESCRIPTION OF THE DRAWINGS

FIG. 7 is a flow chart of the actions taken to implement a second embodiment of the filter for a distributed network described herein.

DETAILED DESCRIPTION

Throughout this description, the embodiments and examples shown should be considered as exemplars, rather than limitations on the apparatus and methods disclosed or claimed.

A server may implement a filter, which may be referred to as a point of indexing filter, to remove copyright infringing files and/or non-desirable files from a network, including peer-to-peer networks. The server implementing the filter may also replace copyright infringing files with alternate approved legal versions of the files. A system and method may achieve this filter by using indexing nodes on a peer-to-peer network to contact a server for authorization to index file entries that are advertised to indexing nodes by ordinary nodes connected to the indexing node. The system and method may also replace advertised file entries with alternate versions.

System

Figure 1:
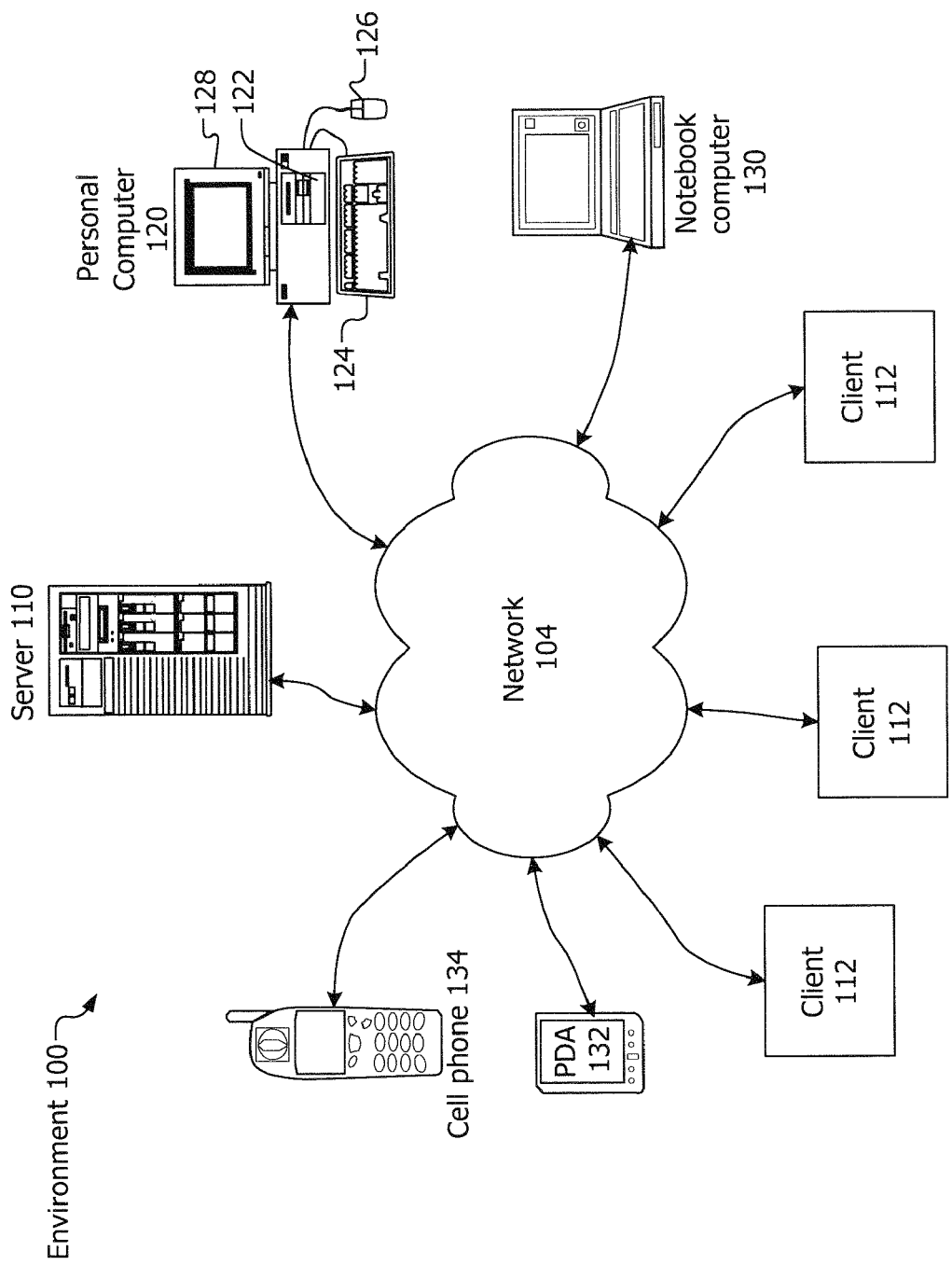
FIG. 1 is a block diagram of an environment in which the filter for a distributed network may be implemented as described herein.

Referring now to FIG. 1, there is shown a block diagram of an environment 100 in which the filter for a distributed network may be implemented as described herein. In the environment 100, multiple client devices 112 may be coupled with and communicate over network 104 with other client devices 112 and with one or more servers 110.

A client device 112 may include software and/or hardware for providing the functionality and features described herein. A client device 112 may include or have stored thereon or therein peer-to-peer software that allows the client device 112 to function as a node on a peer-to-peer network, as described herein. A client device 112 may be a computing device. A computing device as used herein refers to a device with a processor, memory and a storage device that may execute instructions. The term computing device includes, but is not limited to, personal computers 120, server computers 110, computing tablets, set top boxes, video game systems, personal video recorders, telephones, cellular telephones 134, digital telephones, personal digital assistants (PDAs) 132, portable computers, notebook computers 130, and laptop computers. These computing devices may run an operating system, including, for example, variations of the Linux, Unix, MS-DOS, Microsoft Windows, Palm OS, and Apple Mac OS X operating systems.

The techniques described herein may be implemented in software stored on storage media accessible either directly or via a storage device included with or otherwise coupled or attached to a computing device. These storage media include, for example, magnetic media such as hard disks, floppy disks and tape; optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include, hard disk drives, DVD drives, flash memory devices (such as readers and writers), and others.

A client device 112 may include one or more of each of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The hardware and firmware components of the client devices 112 may include various specialized units, circuits, software and interfaces for providing the functionality and features described here. The processes, functionality and features may be embodied in whole or in part in software which operates on a client device 112 and may be in the form of, for example, firmware, an application program, an applet (e.g., a Java applet), a browser plug-in, a COM object, a dynamic linked library (DLL), a script, one or more subroutines, an operating system component or service, and/or a combination thereof.

Client devices 112 typically include a display, user input devices, and a storage media and storage device. For example, when the client device 112 is a personal computer 120, the personal computer 120 includes a display 128, a keyboard 124, a mouse 126 and a hard disk drive 122.

A server 110 is another computing device and refers to a device with a processor, memory and a storage device, and may execute instructions. A server is typically more robust than a client device and typically has greater processing capabilities, greater network throughput, and/or greater storage space when compared to a personal computer or other client device. Although shown as a single server, server 110 may be a server farm, group of servers (including application servers, database servers, content servers, and others), and may include a firewall, load balancer, and other network devices; and may include multiple devices in multiple locations. The server 110 may provide one or more database and other facilities to receive index requests and provide index responses as described herein.

In one embodiment, network 104 is the Internet. Network 104 may support various versions of the Ethernet protocol and other data and/or voice communications protocols. The client devices 112 and server 110 may communicate over the network 104 via wired and/or wireless communications. The client devices 112 and server 110 communicate data units over the network 104. As used herein, a data unit refers to a frame, cell, datagram, packet or other unit of information. The communications between the client devices 112 and the server 110 are pertinent to the techniques, features and functionality described herein.

Figure 2:
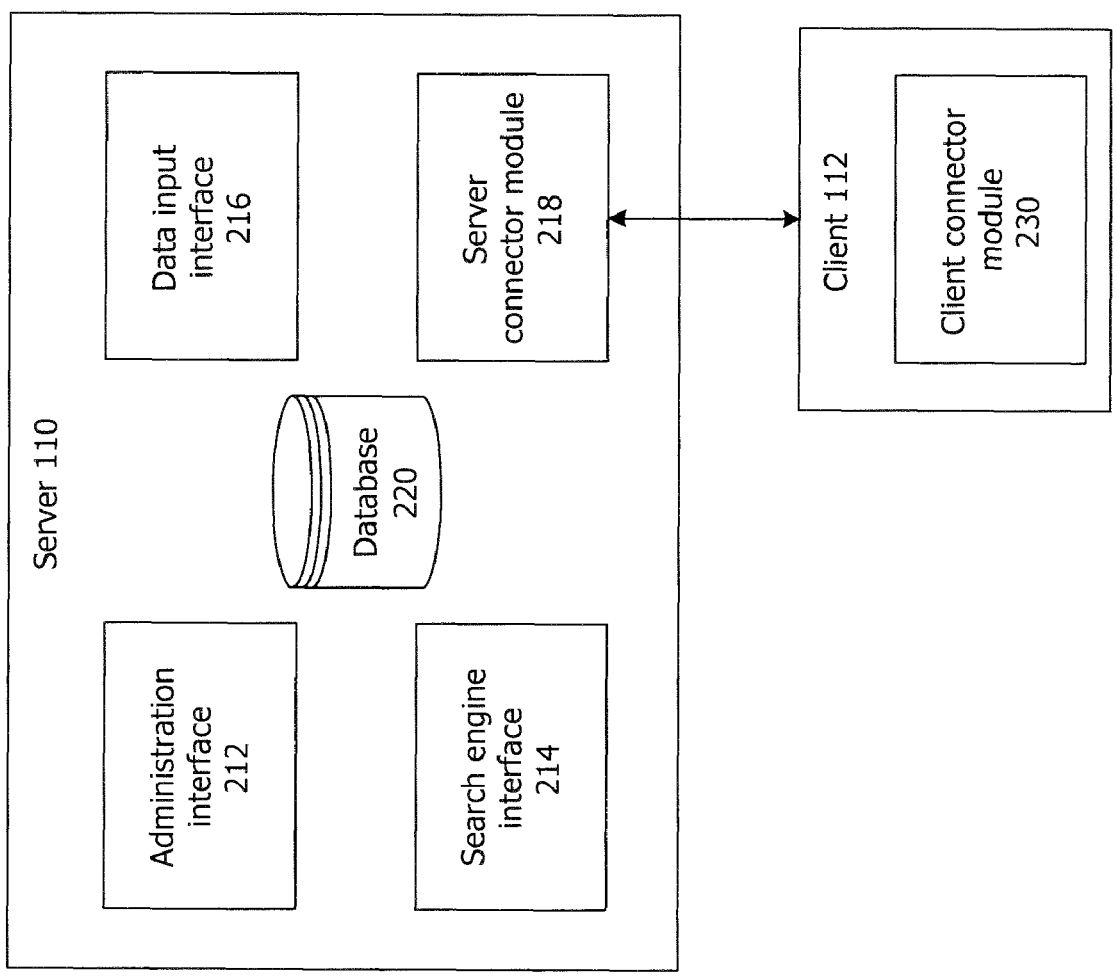
FIG. 2 is a block diagram of a server and a client in which the filter for a distributed network may be implemented as described herein.

FIG. 2 is a block diagram of a server 110 and a client device 112 in which the filter for a distributed network may be implemented as described herein. To achieve the methods described herein in more detail below, server 110 may include typical server software such as, for example, an operating system and communications software, and, additionally: an administration interface 212, a search engine interface 214, a web services interface 216, a server connector module 218, and a database 220. Generally, the server 110 may contain or have access to the database 220.

As will be described in more detail below, the server 110 receives communications from client devices 112 acting as indexing nodes inquiring about files being advertised to the client devices 112 acting as indexing nodes by ordinary nodes—namely, index requests—and sends communications to the indexing nodes in response to the indexing nodes—namely, index responses. In one embodiment, the communications between the server 110 and client device 112 via server connector module 218 and client connector module 230 are encrypted and/or digitally signed. The encryption may prevent third parties on the network from obtaining access to the information in the communications between the server 110 and the client device 112. Other techniques for secure communication between the server 110 and the client device 112 may also be implemented.

The administration interface 212 may allow content filter partners and other participants in the filtering system to log in and add or edit entries for files that are to be filtered from the network. The administration interface 212 may be web-based such that it provides an interface for partners/participants to access the server 110 through a web browser. The communications between the administration interface 212 of server 110 with partners and participants via a web browser may be made secure via secure sockets layer (SSL) encryption and/or other techniques.

The search engine interface 214 may behave as a server-to-server interface. The search engine interface 214 may be a web services interface. The search engine interface 214 may allow other servers to connect to the server for the purpose of allowing servers and/or web sites to subscribe to the list of file entries in the database 220. A web site may subscribe to the server 110 to access the database 220 via search engine interface 214 to obtain information to determine whether it should remove infringing content. For example, the website may remove infringing content when an entry in its database is contained in the database 220. The search engine interface 214 may provide encrypted, secure communications with web servers and other servers.

The data input interface 216 may allow other servers to connect to the server to provide for the automated bulk entry of file entries to the database 220. The data input interface 216 may behave as a server-to-server interface. The data input interface 216 may be a web services interface. The data input interface 216 may provide encrypted, secure communications with web servers and other servers.

The server connector module 218 may provide an interface to client connector modules 230 on client devices. The server connector module 218 may provide encrypted, secure communications with to client connector modules 230 on client devices.

The database 220 may contain information about files that are to be filtered from the network. The database 220 may be used to store information about infringing files that should be removed from the peer-to-peer network. The database 220 may be used to store information about infringing files that should be replaced with licensed versions. The database 220 may also contain information concerning content filter partners and participants, including permissions to log into the server to add file identifiers to the database 220. The database 220 may store information in an encrypted or other secure manner to prevent unwanted access to the information in the database from being disseminated should network security or other security measures be breached.

In addition to an operating system and other software typical for the particular client device 112, the client device also includes client connector module 230. The client connector module 230 may be integrated with, distributed with and/or installed with peer-to-peer file sharing applications. The client connector module 230 may be resident on the computers of people who are running peer-to-peer file sharing applications. The client connector module 230 may be a plug-in to peer-to-peer file sharing applications.

Server 110 and client devices 112 may communicate with each other over a network through server connector module 218 and client connector module 230, respectively.

As to FIG. 2, additional and fewer units, modules or other arrangement of software, hardware and data structures may be used to achieve the processes and apparatuses described herein.

Figure 3:
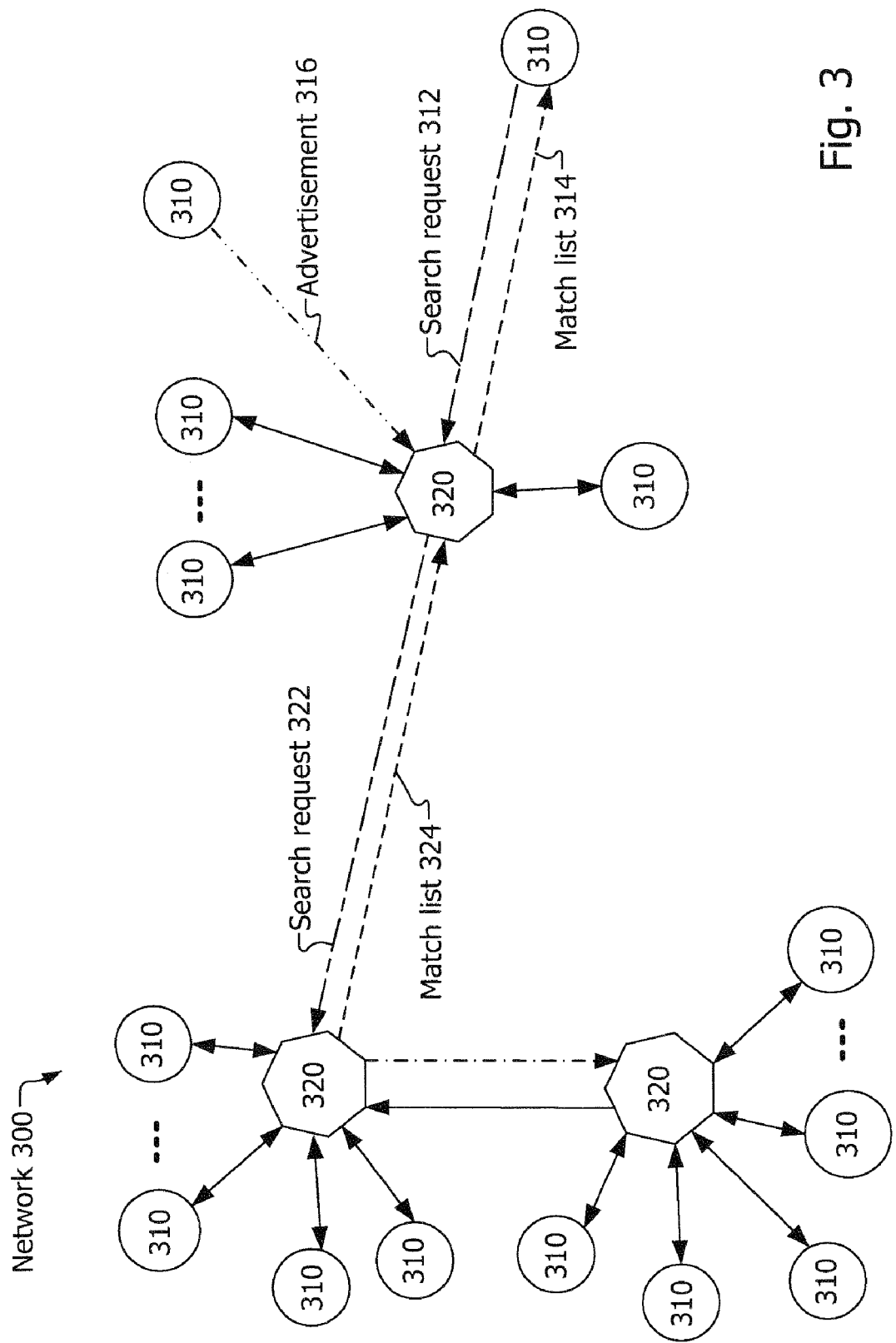
FIG. 3 is a block diagram of a network in which the filter for a distributed network may be implemented as described herein.

FIG. 3 is a block diagram of a network 300 in which the filter for a distributed network may be implemented as described herein. FIG. 3 shows a hierarchical network 300 having ordinary nodes 310 and indexing nodes 320. FIG. 3 shows the peer-to-peer relationship between the nodes in the hierarchical network 300. FIG. 3 shows the peer-to-peer network 300 without any filtering solution in place.

A hierarchical network is a kind of distributed network. A distributed network is a network of autonomous nodes which are not under centralized control. In a flat peer-to-peer distributed network, all nodes are equal, have the same capabilities, and perform the same functions. In contrast, in a hierarchical peer-to-peer distributed network, some nodes—sometimes nodes with greater bandwidth and/or processing power—are given additional duties or responsibilities compared to other nodes. Nodes with additional duties or responsibilities may be referred to as indexing nodes. In a hierarchical peer-to-peer distributed network, only a small fraction of the total nodes may function as indexing nodes.

In a network, including distributed and peer-to-peer networks, an indexing node 320 is a node which may: (a) receive a listing of files advertised to it by other nodes, either or both indexing nodes and ordinary nodes (advertisement 316); and may (b) receive search requests 312 and 322 from other nodes, both ordinary and indexing, when those nodes have initiated a search for a particular file. An indexing node 320 may contain and maintain a database of files that have been advertised to it by nodes which are in communication with it. As used herein, to advertise means to inform other nodes on a network a file is available. To do this, the ordinary node advertises the availability of the file to nodes by communicating over the network 300 with indexing nodes 320 and/or ordinary nodes 310.

User search requests 312 for a particular file are initiated by an ordinary node 310 and are processed by an indexing node 320. Example search requests include one or more of each of words in the title of movies, songs, television shows; names of performers, actors, musicians; and the like. An indexing node 320 may respond to an incoming search request by searching its local database and providing in return a match list 324 of matching file entries. If an indexing node 320 does not have the file requested by an ordinary node 310, the indexing node 320 may contact other indexing nodes 320 via search request 322. That is, the indexing nodes 320 are in communication with each other so that if a given indexing node 320 does not have a requested file in its local database, it may forward the search request 322 to another indexing node 320.

In a flat peer-to-peer network, any node is capable of being an indexing node 320. That is, every node in a flat peer-to-peer network may function as an indexing node. However, because this is inefficient, many peer-to-peer networks elevate a subset (often on the order of a few percent) of the total number of nodes to act as indexing nodes 320. Examples of indexing nodes include "supernodes" in the FastTrack peer-to-peer network and "ultrapeer" nodes in the Gnutella peer-to-peer network.

Nodes in a peer-to-peer network which are not functioning as indexing nodes 320 may be referred to as ordinary nodes 310. As used herein, ordinary nodes 310 may be capable of sending advertisements 316 of available files to indexing nodes 320; sharing out available files; and sending search requests 312 to indexing nodes 320 on the network 300. Ordinary nodes 310 typically do not receive search requests from other nodes and do not maintain a database of content being shared by other nodes. As compared to indexing nodes 320, ordinary nodes 310 typically have less bandwidth and/or processing power. When users at an ordinary node 310 initiate a file search, a search term or search query may be sent as a search request 312 to an indexing node 320 with which that ordinary node is in communication. The ordinary node 310 may then receive in response to the search request 312 a match list 314 from the indexing node 320.

Indexing nodes are distinguished from ordinary nodes for illustrative purposes. The distinction is helpful to describe the systems and methods disclosed herein. There is no additional or special significance to this naming convention. That is, other names may be used to refer to these nodes. It is the functionality and features of the nodes that is pertinent to the description herein. Further, nodes, ordinary and indexing, may be a computing device capable of network communications. Although nodes may typically be personal computers, desktop computers, notebook computers, and server computers, they may also be any computing device.

Figure 4:
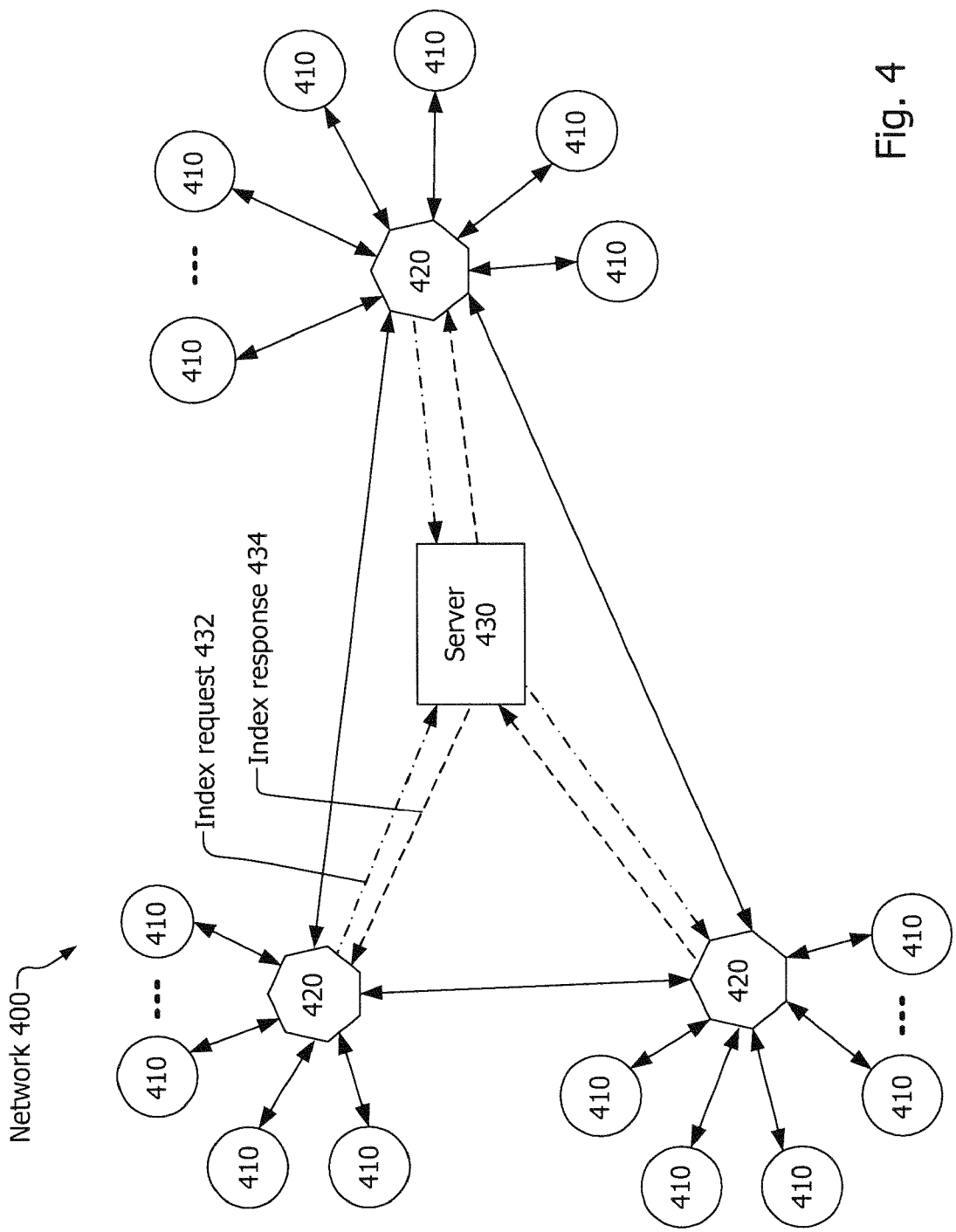
FIG. 4 is a block diagram of a network having a server, indexing nodes, and ordinary nodes in which the filter for a distributed network described herein may be implemented.

FIG. 4 is a block diagram of a network 400 having a server 430, indexing nodes 420, and ordinary nodes 410 in which the filter for a distributed network described herein may be implemented. In addition to the communications and functionality described above in FIG. 3 regarding the indexing nodes 320 and ordinary nodes 310, the ordinary nodes 410 and indexing nodes 420 are augmented with additional functionality which may be achieved in software. The indexing nodes 420 and ordinary nodes 410 may have the same capabilities and functionality of corresponding indexing nodes 320 and ordinary nodes 310 described regarding FIG. 3, and may also perform additional functions and/or have additional capabilities. The server 430 may be the server 110 from FIGS. 1 and 2, and the indexing nodes may be the client device 112 from FIGS. 1 and 2.

The techniques described herein may be implemented using a server 430 to receive and process index requests 432 and to provide index responses 434 to indexing nodes 420. In one embodiment, the index requests and the index responses are encrypted and/or digitally signed. The encryption may prevent third parties on the network from obtaining access to the information in the index requests and the index responses. In one embodiment, the sequence of receiving an index request and providing an index response is a process whereby an indexing node 420 makes a call using its client connector module to ask the server 430 whether the indexing node 420 should index a particular file which has been advertised to it by a node with which it is in communication. In this embodiment, to send an index request, the indexing node 420 uses the client connector module to make a call to the server 430 to check on the status of the requested file. The server 430 may evaluate whether the file is an infringing file which should not be indexed by the indexing node. The server 430 may, via its server connector module, send an index response 434 to the client connector module. The index response 434 may instruct the indexing node 420 to either index or not index the file(s) for which permission was requested. The index response 434 may instruct the indexing node 420 to index an alternate, licensed, file instead of the original file for which permission was requested.

Description of Methods

Figure 5:
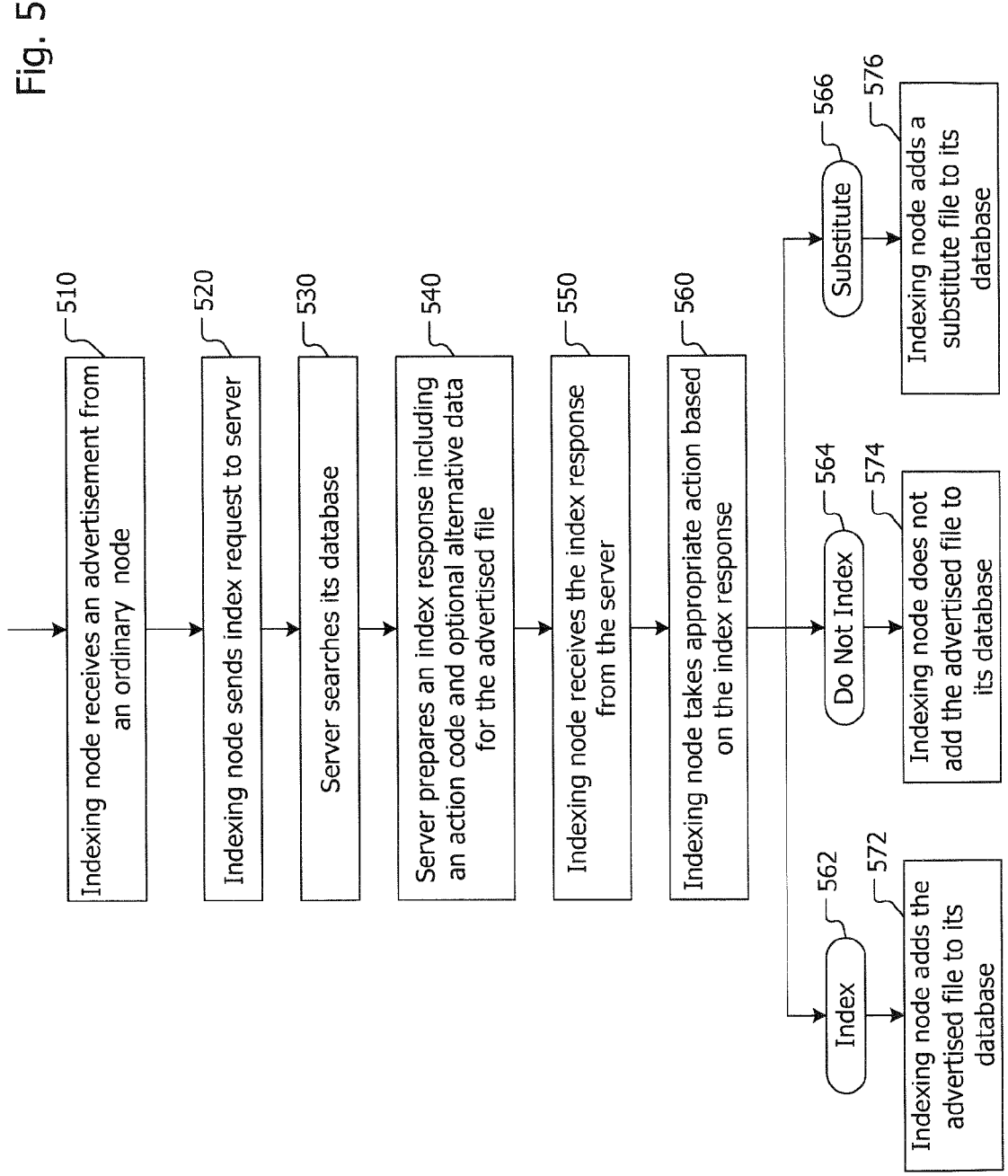
FIG. 5 is a flow chart of an overview of the actions taken to implement an embodiment of the filter for a distributed network described herein.

FIG. 5 is a flow chart of an overview of the actions taken to implement an embodiment of the filter for a distributed network described herein. An indexing node receives an advertisement from an ordinary node, as shown in block 510, informing the indexing node of the availability of an advertised file specified in the advertisement. The advertisement may include a file identifier that uniquely identifies the file available for sharing by the ordinary node.

As used herein, the term file means data identified by a unique identifier. The kind of data stored in a file may be any kind of content, including, for example, without limitation: music; video; text; graphics; a song; a full CD, album or DVD; a book; a magazine; a story; an article; a sporting event; a film; a television program; a concert recording; a newspaper; and others. The file may be in a well-known or proprietary format, including, for example, without limitation, ASCII, portable document format (PDF), MP3, MP4, MPEG, RAW, TIFF, JPEG, WAV, RealAudio, WidowsMedia, and others. References to files may include both the unique identifier of that file and associated meta data about the file. The meta data may include, for example, without limitation, file title, file author, file size, file creation date, file format, encryption used, and/or other information.

A unique identifier is a combination of alphabetic characters and/or numbers and/or symbols that uniquely identify a file. If two files are identical, they have the same unique identifier. The filehash of a file may be the unique identifier for that file. When a file refers to or is a website, the unique identifier may be the uniform resource locater (URL) or uniform resource identifier (URI) of the file. In a content management system or database the unique identifier may be a system created identifier of the file. The unique identifier may be formed from the name of the file concatenated with or otherwise combined with its file size and a cyclical redundancy check (CRC) value of the file. This patent is agnostic to the kind or type of unique identifier used or algorithm used to create the unique identifier.

The indexing node prepares an index request based on the advertisement and sends the index request to the server, as shown in block 520, seeking permission to index the advertised file. The indexing node may encrypt or otherwise secure the index request before transmission to the server. The index request may include a single advertised file or a group of advertised files. The indexing node may send index requests for advertised files immediately upon receipt of or shortly after receipt of a file advertisement from an ordinary node. The indexing node may periodically send index requests for advertised files received over a system defined period of time from one or more ordinary nodes. The system defined period of time may be, for example, one hour, four hours, 12 hours, one day, etc. The indexing node may periodically send index requests for advertised files when a system defined number of advertised files has been received. The system defined number of advertised files may be, for example, four files, 12 files, 16 files, 128 files, 278 files, 1000 files, etc.

The server may receive the search request and searches its database for the file specified in the index request, as shown in block 530. Before the server performs the search, the server may perform a security check to verify or otherwise authenticate that the index request came from an authorized source. The server may decrypt the index request. The server may prepare an index response including an action code and optional alternative data for the advertised file, as shown in block 540. The indexing node may receive the index response from the server, as shown in block 550. The indexing node takes appropriate action based on the index response, as shown in block 560. The appropriate action may be one of: (1) index, as shown in block 562; (2) do not index, as shown in block 564; and (3) substitute, as shown in block 566.

When the appropriate action based on the index response is to index the advertised file, the indexing node adds the file identifier for the advertised file to its database, as shown in block 572. When the appropriate action based on the index response is to not index the advertised file, the indexing node does not add the file identifier for the advertised file to its database, as shown in block 574. When the appropriate action based on the index response is to substitute a file for the advertised file, the indexing node adds a file identifier for a substitute file specified in the index response to its database, as shown in block 576. The file identifier for the substitute file may refer to a copyright protected, licensed or authorized file made available by a copyright owner, licensee, or other authorized legal source and may be provided by a participant or partner. The substitute file may be a URL of a web page or other location where an alternate version of the file may be obtained. The user may be given the option to buy a substitute file in the form of a licensed or otherwise authorized version of the advertised file. A URL may be provided to initiate the purchase of a substitute licensed file.

Figure 6:
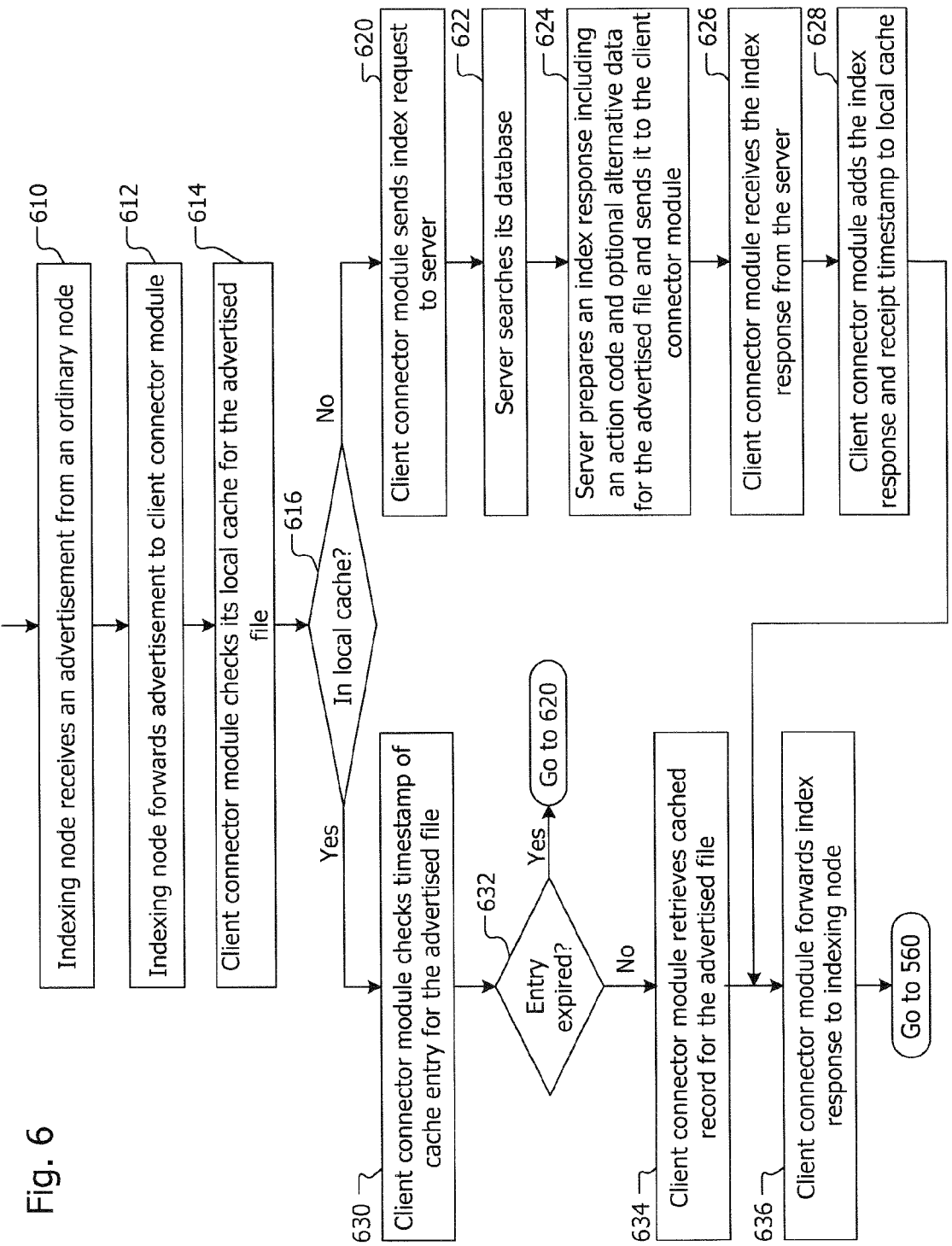
FIG. 6 is a flow chart of the actions taken to implement a first embodiment of the filter for a distributed network described herein.

FIG. 6 is a flow chart of the actions taken to implement a first embodiment of the filter for a distributed network described herein. The filter for a distributed network may be implemented on a network like that shown in FIG. 4 having ordinary nodes, indexing nodes and at least one server. In this embodiment, the ordinary nodes are implemented by a client such as client device 112 shown in FIG. 1 running peer-to-peer software, while the indexing nodes are implemented by a client such as client device 112 shown in FIGS. 1 and 2 running peer-to-peer software augmented with a client connector module as described above regarding FIG. 2. In addition, the server may be implemented as server 110 shown in FIGS. 1 and 2.

A method begins with the indexing node receiving an advertisement from an ordinary node, as shown in block 610. The indexing node forwards the advertisement to its client connector module, as shown in block 612. In this embodiment, the client connector module checks its local cache for the advertised file, as shown in block 614. The flow of actions then continues based on whether the file identifier of the advertised file is in the local cache of the client connector module, as shown in block 616.

When the client connector module determines that the advertised file is not in its local cache, the flow of actions continues at block 620, where the client connector module sends an index request to the server. The server then searches its database for the file identifier or identifiers specified in the index request, as shown in block 622. The server prepares an index response including an action code and optional alternative data for the advertised file and sends the index response to the client connector module via its server connector module, as shown in block 624. The client connector module receives the index response from the server, as shown in block 626, and creates a corresponding receipt timestamp for the index response. The client connector module then adds the index response and the receipt timestamp to its local cache, as shown in block 628. The client connector module then forwards the index response to the indexing node, as shown in block 636. The flow of actions continues at block 560 of FIG. 5 as described above.

When the client connector module determines that the advertised file is in its local cache, the flow of actions continues at block 630, where the client connector module checks the timestamp of the cache entry for the advertised file. The check of the timestamp may be made to determine if the cache entry for the advertised file has expired. An entry may be deemed to have expired if it the timestamp shows that the entry was received more than a system defined amount of time earlier. The system defined period of time may be hours, days, or any portion thereof. In one embodiment, an entry is deemed to have expired if it has been in the cache longer than four days. The flow of actions continues based on whether the timestamp of the entry for the advertised file has expired, as shown in block 632.

When the entry has expired, the flow of actions continues at block 620, as if there was no entry for the advertised file in the local cache of the client connector module.

When the entry has not expired, the flow of actions continues at block 634, where the client connector module retrieves the cached record for the advertised file. The client connector module then prepares an index response based on the cached record for the advertised file. The client connector module then forwards the index response to the indexing node, as shown in block 636. The flow of actions continues at block 560 of FIG. 5 as described above.

FIG. 7 is a flow chart of the actions taken to implement a second embodiment of the filter for a distributed network described herein. The filter for a distributed network may be implemented on a network like that shown in FIG. 4 having ordinary nodes, indexing nodes and at least one server. In this embodiment, the ordinary nodes are implemented by a client such as client device 112 shown in FIG. 1 running peer-to-peer software, while the indexing nodes may be implemented by a client such as client device 112 shown in FIG. 1 running peer-to-peer software. In this embodiment, the functionality of the client connector module described above regarding FIGS. 2 and 6 is merged into or otherwise included in the peer-to-peer application running on the indexing nodes. In addition, the server may be implemented as server 110 shown in FIGS. 1 and 2.

The indexing node receives an advertisement from an ordinary node, as shown in block 710. The indexing node searches its local database for the file identifier of the advertised file, as shown in block 712. The flow of actions then continues based on whether the file identifier of the advertised file is in the database of the indexing node, as shown in block 716.

When the indexing node determines that the file identifier of the advertised file is not in its database, the indexing node sends an index request to the server, as shown in block 720. The server searches its database, as shown in block 722. The server prepares an index response including an action code and optional alternative data for the advertised file and sends it to the indexing node, as shown in block 724. The indexing node receives the index response from the server, as shown in block 726, and prepares a receipt timestamp. The indexing node adds information from the index response and a corresponding receipt timestamp to its database as a record or entry for the advertised file, as shown in block 728. The flow of actions continues at block 560 of FIG. 5 as described above.

When the indexing node determines that the advertised file is in its database, the flow of actions continues at block 730, where the indexing node checks the timestamp of the database entry for the advertised file. The check of the timestamp is made to determine if the entry for the advertised file has expired. An entry is deemed to have expired if its timestamp shows that the record was received more than a system defined amount of time earlier. The system defined amount of time may be hours, days, or any portion thereof. In one embodiment, an entry is deemed to have expired if it has been in the database longer than seven days. The flow of actions continues based on whether the timestamp of the entry for the advertised file has expired, as shown in block 732.

When the entry has expired, the flow of actions continues at block 720, as if there was no record for the advertised file in the database of the indexing node.

When the entry has not expired, the flow of actions continues at block 734, where the indexing node reviews the database record for the advertised file. The indexing node takes appropriate action based on the record for the advertised file, as shown in block 736. The appropriate action may be to do nothing; to update the database record for the advertised file; to index the advertised file; to remove the advertised file entry from the index; to replace the existing indexed entry with an entry for an alternate, possibly copy protected, file; to replace the existing indexed entry with a URL of a web page or other location where an alternate version of the file may be obtained; or other action. At this point, an additional check may be performed to determine whether the record for the indexed file is licensed or otherwise authorized. If warranted, an alternate file may be substituted for the indexed file. The substitute file may be a URL of a web page or other location where an alternate version of the file may be obtained. The user may be given the option to buy a substitute file in the form of a licensed or otherwise authorized version of the advertised file. A URL may be provided to initiate the purchase of a substitute licensed file.

When implementing and rolling out point-of-indexing filter software in servers and indexing nodes, some nodes on the network will not include a point-of-indexing filter. This may occur when introducing a new version of a peer-to-peer application that has added point-of-indexing filter functionality. In this case, existing nodes on the network will not include any point-of-indexing filtering; only the new nodes will include point-of-indexing filter. In addition, it is contemplated that hackers may modify peer-to-peer applications or indexing nodes to remove a point-of-indexing filter capability such that a subset of the nodes on the peer-to-peer network run hacked peer-to-peer applications without filtering methods, or with disabled filtering methods. To assist in the introduction of point-of-indexing filtering to peer-to-peer network, and/or to reduce or eliminate the impact of hacked versions of peer-to-peer applications and nodes, an embodiment of the peer-to-peer applications running on ordinary nodes may be implemented with a preferred indexing node feature. Peer-to-peer applications having the preferred indexing node feature may send search requests to indexing nodes which provide a point-of-indexing filter, and/or may not send requests to indexing nodes which do not provide point-of-indexing filter capability.

In a peer-to-peer network that includes ordinary nodes and indexing nodes in which some ordinary nodes and indexing nodes incorporate a point-of-indexing filter and others do not, the following method may be implemented in conjunction with the methods described above in FIGS. 5, 6 and 7. When a new user at an ordinary node wishes to gain access to a peer-to-peer network, the ordinary node may connect to one or more indexing nodes on the network. The ordinary node may send a participant query to one or more of the indexing nodes to determine whether the indexing node implements the point-of-indexing filter. The participant query may be a data unit that includes a code that signifies a request asking the indexing node to provide a participant response indicating its software version and/or software build date and/or software capabilities, including whether the indexing node implements a point-of-indexing filter. The ordinary node may, in one embodiment, determine the capabilities of the indexing node based on the software version and/or build date specified in the participant response. This may be achieved by including in the ordinary node or providing the ordinary node access to authenticated participant information. The authenticated participant authentication information may include a build date and/or a version number such that all software having a version number exceeding an authenticated participant version number and/or having a build date later than an authenticated participant build date is known to incorporate point-of-indexing filter features.

In one embodiment, the peer-to-peer application may engage in a challenge-response exchange with each prospective indexing node to learn whether the indexing node is an authenticated participant that provides point-of-indexing filter features. An embodiment of a challenge-response exchange may perform the following process.

A new ordinary node running a peer-to-peer application may contact an authentication server requesting a challenge string. The authentication server may be the same server as the server that implements the server described regarding FIGS. 5, 6 and 7, or may be a different server under the control of or in partnership with the same entity that controls the server described regarding FIGS. 5, 6 and 7. In response to receiving the challenge string request, the authentication server may provide two random character strings, String A and String B, referred to as sibling strings. The authentication server may store both sibling strings in an authentication database. The authentication server may store may also store information identifying the ordinary node. The ordinary node may send an authentication query including String A to a prospective indexing node. In response to receiving the authentication query, the prospective indexing node may contact the authentication server, sending a sibling query including String A, requesting a sibling string. The authentication server receives the sibling query and prepares a sibling response. The sibling response will include String B if the indexing node is an authenticated participant that provides point-of-indexing filter features. The prospective indexing node responds to the ordinary node, supplying the sibling string it received from the authentication server. The ordinary node compares the sibling string received from the authentication server with the string received from the prospective indexing node. If the two strings match, the indexing server is authenticated as having point-of-index filter capability. The ordinary node may select this particular indexing node as the, or one of the, indexing nodes to which it will send search queries and from which it accept search results. If the sibling string received from the authentication server does not match the string received from the prospective indexing node, the ordinary node will not send search queries to the indexing node or accept search results from it.

In other embodiments, the peer-to-peer application on ordinary nodes may include, store or access a locally stored black list and/or a locally stored white list of indexing nodes. Ordinary nodes running a peer-to-peer application may determine which indexing nodes to advertise to and/or receive match lists from based on reference to the black lists and/or white lists. In another embodiment, the peer-to-peer application may access a remotely stored and maintained black list and/or white list of indexing nodes which may be located at an authentication server.

In one embodiment, all ordinary nodes may function as indexing nodes. That is, in one embodiment, all nodes in a peer-to-peer network are indexing nodes. Stated yet another way, in one embodiment, all nodes function as both indexing nodes and ordinary nodes.

Example Data Units

The following is an example format of one embodiment of an index request data unit sent from the client connector module to the server in the embodiment shown in and described regarding FIG. 6 and from the indexing node to the server in the embodiments shown in and described regarding FIGS. 5 and 7.

| INDEX REQUEST DATA UNIT | |
|---|---|
| Field | Description |
| Data_type | The contents of the data unit. As described herein, the contents of the data unit is an index request. In an example embodiment, the Data_type is "GFRIPC" for global file registry indexing permission check. |
| Data_format | A version number of this format of the file. This field allows the data format to be changed in future and for the inclusion of multiple different file formats for one or more of a variety of content. |
| Client_name | This is the name of the parent application - for example, "someProgram" - which is may be used by the server knows how to interpret the network-specific Data Elements which follow. |
| Client_version | This is the version number of the parent application, needed so that the server can deal with multiple versions of the parent application's data elements. |
| Transaction_ID | A unique ID number for this data unit, assigned by the client connector module. |
| Data_Element 1 . . . N | One or more data elements. The format of each data element is described below. |
| Random | Random data, used to avoid replay attacks, for other security reasons, and for other functions. In one embodiment, the random data is 10 bytes in size. |
| Signature | A digital signature for the entire data unit, including the plain-text fields. |

In one embodiment, the Data_type and Data_format fields are plain text, and the fields from client name through the signature are encrypted. In other embodiments, the Data_type and Data_format fields are alphabetic and/or numeric values that are system defined.

The following is the format of one embodiment of the Data_Element field of the index request data unit.

| INDEX REQUEST DATA ELEMENT FIELD FORMAT | |
|---|---|
| Field | Description |
| Element_ID | An ID or handle assigned to each data element used by the client connector module to correlate permissions received from the server in response to the request. In one embodiment the Element_ID is simply numbered 1 . . . , 2 . . . , 3 . . . , within each data unit. When the client connector module receives a response from the server, it can use a combination of the Transaction_ID and the Element_ID to uniquely identify a particular request that it has sent to the server. |
| File_Identifier | The file identifier is a unique identifier for the file for which indexing permission is being sought. The format and/or kind of unique identifier may be dependent on the network. For example, in Gnutella based networks, the File_Identifier may be a 160-bit filehash. |
| Space_Identifier | An optional identifier that may specify the user space in which the file is to be indexed. |

The following is the format of one embodiment of the index response data unit sent from the server to the client connector module in the embodiment shown in and described regarding FIG. 6 and from the server to the indexing node in the embodiments shown in and described regarding FIGS. 5 and 7.

| INDEX RESPONSE DATA UNIT | |
|---|---|
| Field | Description |
| Data_type | The contents of the data unit. As described herein, the contents of the data unit is an index response. In an example embodiment, the Data_type is "GFRIPR" for global file registry indexing permission reply. |
| Data_format | A version number of this format of the file. This field allows the data format to be changed in future and for the inclusion of multiple different file formats for one or more of a variety of content . . . |
| Transaction_ID | This Transaction_ID matches the Transaction_ID sent in the index request data unit. |
| Data_Element 1 . . . N | One or more data elements. The format of each data element is described below. |
| Random | Random data, used to avoid replay attacks, for other security reasons, and for other functions. In one embodiment, the random data is 10 bytes in size. |
| Signature | A digital signature for the entire data unit, including the plain-text fields. |

The following is the format of one embodiment of the Data_Element field of the index response data unit.

| INDEX RESPONSE DATA ELEMENT FIELD FORMAT | |
|---|---|
| Data Element field | Description |
| Element_ID | The Element_ID of the corresponding element sent in the Index Permission Request |
| Action_Code | 0 = File unknown, okay to index<br>1 = File good, okay to index<br>2 = File bad, do not index<br>3 = File bad, replace with alternative (Alt) entry, referred to in the description herein as "substitute" |

-continued

INDEX RESPONSE DATA ELEMENT FIELD FORMAT

| Data Element field | Description |
|---|---|
| | 4 = Server Busy, don't try again for at least N minutes, where N may be an appropriate value such as, for example, 2, 5, 10, 22, 30, 60, and others.<br>5 = File bad, replace with URL or location where an alternate licensed version of the file may be found, purchased and/or downloaded. |
| Alt_Identifier<br>Alt_Filename<br>Alt_Title<br>Alt_Author<br>Alt_Album<br>Alt_FallbackURL | If the Action Code is "File bad, replace with Alt entry"/"substitute", the server and/or the client connector module may return these Alt fields to the calling application on the indexing node so that the indexing node may replace the file entry for which the index request was submitted with the specified replacement file. These fields are not present if the Action Code is anything other than "File bad, replace with Alt entry"/"substitute". |

CLOSING COMMENTS

The point of indexing systems and methods described above may reduce traffic to the server which maintains the list of infringing content which is to be removed from the network when compared to the point of search/download solution and the point of sharing solution described above. This may reduce the cost of running servers when compared to the point of search/download solution and the point of sharing solution described above and to other solutions which involve each node on the network having to individually make contact with a server to determine whether a file may be downloaded from and/or shared out to other nodes on a network.

The server in the point of indexing systems and methods described above may have no knowledge of the IP address or identity of individual users on the peer-to-peer network who are conducting searches, receiving files and/or sharing files. The point of indexing systems and methods described above may be implemented to maintain user privacy.

In one embodiment, users of a hacked version of the client peer-to-peer application gain no advantage when the point of indexing systems and methods described above are employed. As such, when one embodiment of the point of indexing systems and methods described above are employed, there is little motivation for hackers to create hacked versions and no motivation for users to install hacked versions of the client peer-to-peer application.

When one embodiment of the point of indexing systems and methods described above are employed, the point of indexing systems and methods described above are effective when less than all users of a peer-to-peer network install a version of the client peer-to-peer application which incorporates the point of indexing filtering described herein. In some embodiments of peer-to-peer networks, a success threshold is reached when a particular portion of users—on the order of 30%—have installed a version of the client peer-to-peer application which includes the point of indexing filter techniques described above. When the success threshold is reached, infringing content is filtered from the entire peer-to-peer network, such that infringing content is successfully filtered from all users—importantly, including users who are running peer-to-peer clients which do not include the point of indexing filter.

The foregoing is merely illustrative and not limiting, having been presented by way of example only. Although examples have been shown and described, it will be apparent to those having ordinary skill in the art that changes, modifications, and/or alterations may be made.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, whether in the written description or the claims, "plurality" means two or more.

As used herein, whether in the written description or the claims, the terms "comprising", "including", "having", "containing", "involving", and the like are to be understood to be open-ended, that is, to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another of the temporal order in which acts of a method are performed, but are used merely as labels to distinguish one claim element having a certain name from another element having a same name (but of use of the ordinal term) to distinguish the claim elements.

As used herein, "and/or" means that the listed items are alternatives, but the alternatives also include any combination of the listed items.

It is claimed:

1. A server coupled to a network comprising a plurality of ordinary nodes and a plurality of indexing nodes, the server comprising: at least one processor operable to:
   (A) receive an index request from an indexing node in the plurality of indexing nodes, said index request being a request for permission for said indexing node to index a file;
   (B) determine whether or not an identifier for the file corresponds to an entry in a database, said database comprising a plurality of file identifiers and one or more action codes corresponding to each of said plurality of file identifiers; and
   (C) provide an index response to the indexing node in response to the index request, said index response being based, at least in part, on (i) whether or not the identifier for the file corresponds to an entry in the database, and, when the identifier for the file corresponds to an entry in the database, said index response being based, at least in part, on (ii) one or more action codes in said database corresponding to said identifier for said file, wherein said index response comprises one of:
      (i) a first indication that the indexing node has permission to index the file; and
      (ii) a second indication that the indexing node does not have permission to index the file; and
      (iii) a third indication that the indexing node should index a substitute file instead of the file,
   wherein the server is distinct from the plurality of indexing nodes and wherein the network comprises a peer-to-peer network.

2. The server of claim 1, wherein the index response comprises alternative data.

3. The server of claim 2 wherein the alternative data includes an identification of the substitute file to be indexed instead of the file.

4. The server of claim 1, wherein the index request comprises a file identifier.

5. The server of claim 4 wherein the file identifier comprises a hash of the file.

6. The server of claim 1, wherein the server is configured to receive the index request over the Internet and to provide the index response over the Internet.

7. The server of claim 1 wherein the identification of the substitute file comprises a uniform resource locator (URL) or a uniform resource identifier (URI) of the substitute file.

8. A computer-implemented method operable in network comprising a a plurality of indexing nodes and a server, the method comprising the steps of:
 (A) receiving at the server an index request from an indexing node over the network, said index request asking whether said indexing node is permitted to index a file; and
 (B) responsive to the index request, the server:
  (b1) determining whether an identifier for the file corresponds to an entry in a database, said database comprising a plurality of file identifiers and one or more action codes corresponding to each of said plurality of file identifiers; and
  (b2) providing over the network an index response to the indexing node, the index response being based, at least in part, on (i) whether or not the identifier for the file corresponds to an entry in the database, and wherein, when the identifier for the file corresponds to an entry in the database the index response is based, at least in part, on (ii) one or more action codes corresponding to the file identifier in the database, wherein the index response comprises one of:
   (i) a first indication that the indexing node has permission to index the file,
   (ii) a second indication that the indexing node does not have permission to index the file, and
   (iii) a third indication that the indexing node should index a substitute file instead of the file identified by the file identifier, wherein the server is distinct from the plurality of indexing nodes, and wherein the network comprises a peer-to-peer network.

9. The method of claim 8, wherein the index request comprises a file identifier identifying the file.

10. The method of claim 9 wherein the file identifier comprises a hash of the file.

11. The method of claim 8, wherein the index response comprises alternative data.

12. The method of claim 11, wherein the alternative data comprises an identifier of a different version of the file identified by the file identifier.

13. The method of claim 12 wherein the identifier of the different version of the file is a uniform resource locator (URL) or a uniform resource identifier (URI) of the different version of the file.

14. The method of claim 11, wherein the alternative data comprises the identifier of a copy protected version of the file identified by the file identifier.

15. The method of claim 8, wherein the index response includes an identification of the substitute file.

16. The method of claim 15 wherein the identification of the substitute file comprises a uniform resource locator (URL) or a uniform resource identifier (URI) of the substitute file.

17. The method of claim 8, wherein the network is the Internet.

18. A server coupled to a network comprising a plurality of nodes, the server comprising: at least one processor operable to:
 receive an index request from one of the nodes over the network, the index request including a file identifier for a file, said index request being a request for permission for said one of the nodes to index said file;
 determine whether the file identifier for the file corresponds to an entry in a database, said database comprising a plurality of file identifiers and one or more action codes corresponding to each of said plurality of file identifiers; and
 provide an index response over the network to the one of the nodes in response to the index request, said index response being based, at least in part, on (i) whether or not the file identifier for the file corresponds to an entry in the database, and, when the file identifier for the file corresponds to an entry in the database, said index response being based, at least in part, on (ii) one or more action codes in said database corresponding to said file identifier for said file, said index response including one of:
  (i) a first indication that the indexing node has permission to index the file,
  (ii) a second indication that the indexing node does not have permission to index the file, and
  (iii) a third indication that the indexing node should index a substitute file instead of the file,
 wherein the server is distinct from said plurality of nodes, and wherein the network comprises a peer-to-peer network.

19. The server of claim 18, wherein the index response further comprises alternative data.

20. The server of claim 19, wherein the alternative data comprises an identification of the substitute file to be indexed instead of the file.

21. The server of claim 18, wherein the substitute file is a different version of the file identified by the file identifier.

22. The server of claim 18, wherein the substitute file is a copy protected version of the file the file identified by the file identifier.

23. The server of claim 18, wherein the index response includes an identification of the substitute file.

24. The server of claim 18, wherein the server is configured to receive the index request over the Internet and to provide the index response over the Internet.

25. An indexing node coupled to a network comprising a plurality of ordinary nodes and at least one server, the indexing node comprising: at least one processor operable to:
 receive file advertisements from ordinary nodes over the network, each file advertisement specifying at least one advertised file;
 send over the network index requests to the server seeking permission for said indexing node to index the advertised file; and
 receive over the network index responses from the server in response to the index requests, said index responses indicating whether or not said indexing node has permission to index the at least one advertised file, wherein the index response comprises one of: (i) a first indication that the indexing node has permission to index the advertised file, (ii) a second indication that the indexing node does not have permission to index the advertised file, and (iii) a third indication that the indexing node should index a substitute file instead of the advertised file, said index response being based, at least in part, on whether or not an identifier for said file corresponds to an entry in a database, as determined by said server; and based at least in part on said index responses, index the at least one advertised file when at least one index response from said server indicates that the indexing node has permission to index the at least one advertised file, and not index the at least one advertised file when the index response from the server indicates that the indexing node does not have permission to index the at least one advertised file; and to index the substitute file when the index response includes the third indication that the indexing node should index the substitute file instead of the advertised file, wherein said at least one server is distinct from the indexing node, and wherein the network comprises a peer-to-peer network.

26. The indexing node of claim 25, wherein the index response comprises an action code.

27. The indexing node of claim 25, wherein the index response comprises alternative data.

28. The indexing node of claim 25, wherein the index response includes an identification of the substitute file.

29. The indexing node of claim 28 wherein the identification of the substitute file comprises a uniform resource locator (URL) or a uniform resource identifier (URI) of the substitute file.

30. The indexing node of claim 25, wherein the index request comprises a file identifier for the advertised file.

31. The node of claim 30 wherein the file identifier comprises a hash of the advertised file.

32. The indexing node of claim 25, wherein the network is the Internet.

33. The indexing node of claim 25 further configured to: resend the index request when the index response includes a retry action code.

34. The indexing node of claim 25, wherein the substitute file is a different version of the advertised file.

35. The indexing node of claim 25, wherein the substitute file is a copy protected version of the advertised file.

36. A node coupled to a network comprising a plurality of nodes and at least one server, the node comprising: at least one processor operable to:
- (A) receive a file advertisement from another node in the network, the file advertisement specifying an advertised file;
- (B) send an index request to the server seeking permission to index the advertised file, the index request including at least one file identifier corresponding to the advertised file;
- (C) receive an index response from the server in response to the index request, the index response including an indication of whether or not the node has permission to index the advertized file, wherein the index response comprises one of: (i) a first indication that the indexing node has permission to index the advertised file, and (ii) a second indication that the indexing node does not have permission to index the advertised file;
- (D) index the advertised file when the index response includes an indication that the indexing node has permission to index the advertised file, and not index the advertised file when the index response includes indication that the indexing node does not have permission to index the advertised file; and
- (E) index a substitute file when the index response includes an indication that the indexing node should index the substitute file instead of the advertised file, wherein said at least one server is distinct from the plurality of nodes, and wherein the network comprises a peer-to-peer network.

37. The node of claim 36, wherein the index response further comprises alternative data.

38. The node of claim 36 further configured to: resend the index request when the index response includes a retry action code.

39. The node of claim 36, wherein the substitute file is a different version of the advertised file.

40. The node of claim 36, wherein the substitute file is a copy protected version of the advertised file.

* * * * *